US011076290B2

(12) United States Patent
Curtis et al.

(10) Patent No.: US 11,076,290 B2
(45) Date of Patent: *Jul. 27, 2021

(54) ASSIGNING AN AGENT DEVICE FROM A FIRST DEVICE REGISTRY TO A SECOND DEVICE REGISTRY

(71) Applicant: ARM IP Limited, Cambridge (GB)

(72) Inventors: William Allen Curtis, Austin, TX (US); Douglas Miles Anson, Austin, TX (US); Kerry S Balanza, Austin, TX (US)

(73) Assignee: ARM IP Limited, Cambridge (GB)

( * ) Notice: Subject to any disclaimer, the term of this patent is extended or adjusted under 35 U.S.C. 154(b) by 522 days.

This patent is subject to a terminal disclaimer.

(21) Appl. No.: 16/009,277

(22) Filed: Jun. 15, 2018

(65) Prior Publication Data
US 2018/0295119 A1    Oct. 11, 2018

Related U.S. Application Data

(63) Continuation of application No. 15/060,639, filed on Mar. 4, 2016, now Pat. No. 10,027,646, which is a
(Continued)

(51) Int. Cl.
*H04W 12/069* (2021.01)
*H04L 29/06* (2006.01)
(Continued)

(52) U.S. Cl.
CPC ........... *H04W 12/069* (2021.01); *H04L 63/06* (2013.01); *H04L 63/08* (2013.01); *H04L 63/101* (2013.01);
(Continued)

(58) Field of Classification Search
CPC ..... H04W 12/00; H04W 12/02; H04W 12/04; H04W 12/06; H04W 12/0609;
(Continued)

(56) References Cited

U.S. PATENT DOCUMENTS

| 5,737,419 A | 4/1998 | Ganesan |
| 8,108,455 B2 | 1/2012 | Yeager |

(Continued)

FOREIGN PATENT DOCUMENTS

| AU | 2013/100802 | 7/2013 |
| KR | 2006-0126705 | 12/2006 |

(Continued)

OTHER PUBLICATIONS

Office Action dated Jul. 8, 2019 in U.S. Appl. No. 16/035,765, 16 pages.

(Continued)

*Primary Examiner* — Robert B Leung
*Assistant Examiner* — Adrian Stoica
(74) *Attorney, Agent, or Firm* — Nixon & Vanderhye P.C.

(57) ABSTRACT

An agent device is registered in a first device registry maintained by a first registry apparatus for authenticating agent devices for communicating with application providing apparatuses. The agent device can be assigned to a second device registry maintained by second registry apparatus. The method of assignment comprises the first registry apparatus receiving from a requestor device a device assignment request. In response to the device assignment request, the first registry apparatus checks whether the agent device is allowed to be assigned to the second device registry, and if so, the agent device transmits second authentication information for authenticating the identity of the agent device to the second registry apparatus which registers this in the second device registry.

19 Claims, 17 Drawing Sheets

Related U.S. Application Data continuation of application No. 14/056,459, filed on Oct. 17, 2013, now Pat. No. 9,307,405.

(51) Int. Cl.
*H04L 29/08* (2006.01)
*H04W 4/70* (2018.01)

(52) U.S. Cl.
CPC ...... *H04L 63/0823* (2013.01); *H04L 63/0876* (2013.01); *H04L 67/12* (2013.01); *H04W 4/70* (2018.02)

(58) Field of Classification Search
CPC ......... H04W 12/08; H04W 4/02; H04W 4/06; H04W 4/08; H04W 4/18; H04W 88/02; H04W 88/06; H04W 88/08; H04W 88/10; H04W 12/069; H04L 63/00; H04L 63/06; H04L 63/061; H04L 63/062; H04L 63/08; H04L 63/0823; H04L 63/0853; H04L 63/0876; H04L 63/101; H04L 63/20
See application file for complete search history.

(56) References Cited

U.S. PATENT DOCUMENTS

| | | | |
|---|---|---|---|
| 8,370,491 B1 | 2/2013 | Breau et al. | |
| 8,554,912 B1 | 10/2013 | Reeves | |
| 8,738,898 B2 | 5/2014 | Herwono | |
| 8,787,575 B2 | 7/2014 | Laaksonen | |
| 8,788,825 B1 | 7/2014 | Le | |
| 9,307,405 B2 | 4/2016 | Curtis et al. | |
| 9,356,968 B1 | 5/2016 | Dotan | |
| 9,860,235 B2 | 1/2018 | Curtis et al. | |
| 10,129,268 B2 | 11/2018 | David et al. | |
| 2001/0027527 A1 | 10/2001 | Khidekel | |
| 2002/0090085 A1 | 7/2002 | Vanstone | |
| 2003/0028763 A1 | 2/2003 | Malinen | |
| 2003/0196084 A1 | 10/2003 | Okereke | |
| 2006/0053276 A1 | 3/2006 | Lortz et al. | |
| 2006/0104234 A1 | 5/2006 | Zhang | |
| 2006/0117177 A1 | 6/2006 | Buer | |
| 2006/0150241 A1 | 7/2006 | Huh et al. | |
| 2006/0161771 A1 | 7/2006 | Zhang | |
| 2006/0200855 A1 | 9/2006 | Willis | |
| 2006/0218393 A1 | 9/2006 | Hernandez | |
| 2006/0259765 A1 | 11/2006 | Song et al. | |
| 2006/0277406 A1 | 12/2006 | Hashimoto et al. | |
| 2007/0011446 A1 | 1/2007 | Kato et al. | |
| 2007/0055867 A1 | 3/2007 | Kanungo | |
| 2007/0130476 A1 | 6/2007 | Mohanty | |
| 2007/0143388 A1 | 6/2007 | Futa | |
| 2007/0220589 A1 | 9/2007 | Salowey et al. | |
| 2008/0034207 A1 | 2/2008 | Cam-Winget | |
| 2008/0130902 A1 | 6/2008 | Foo Kune et al. | |
| 2008/0256616 A1 | 10/2008 | Guarraci | |
| 2009/0013177 A1 | 1/2009 | Lee et al. | |
| 2009/0063851 A1 | 3/2009 | Nijdam | |
| 2009/0086977 A1 | 4/2009 | Berggren | |
| 2009/0215477 A1 | 8/2009 | Lee et al. | |
| 2009/0287922 A1 | 11/2009 | Herwono | |
| 2009/0313466 A1 | 12/2009 | Naslund et al. | |
| 2010/0269156 A1* | 10/2010 | Hohlfeld .................. H04L 9/321 726/4 |
| 2010/0304716 A1 | 12/2010 | Hocksel et al. | |
| 2011/0154454 A1 | 6/2011 | Frelechoux | |
| 2011/0161663 A1 | 6/2011 | Nakhjiri | |
| 2011/0191765 A1 | 8/2011 | Lo | |
| 2011/0225296 A1 | 9/2011 | Hong et al. | |
| 2011/0231281 A1 | 9/2011 | O'Connor | |
| 2011/0231652 A1 | 9/2011 | Bollay | |
| 2012/0042081 A1 | 2/2012 | Liao et al. | |
| 2012/0108207 A1 | 5/2012 | Schell et al. | |
| 2012/0122423 A1 | 5/2012 | Helmreich | |
| 2012/0221725 A1 | 8/2012 | Schroeder, Jr. et al. | |
| 2013/0035067 A1 | 2/2013 | Zhang et al. | |
| 2013/0081113 A1 | 3/2013 | Cherian et al. | |
| 2013/0095789 A1 | 4/2013 | Keevill | |
| 2013/0150105 A1 | 6/2013 | Clevorn | |
| 2013/0174241 A1 | 7/2013 | Cha | |
| 2013/0222109 A1 | 8/2013 | Lim | |
| 2013/0267272 A1* | 10/2013 | Yang ................. H04W 36/0066 455/552.1 |
| 2013/0310003 A1 | 11/2013 | Sadhvani et al. | |
| 2014/0082348 A1* | 3/2014 | Chandrasekaran ... H04W 12/02 713/150 |
| 2014/0082715 A1 | 3/2014 | Grajek | |
| 2014/0099916 A1 | 4/2014 | Mallikarjunan et al. | |
| 2014/0165147 A1 | 6/2014 | Hershberg et al. | |
| 2014/0289790 A1 | 9/2014 | Wilson | |
| 2015/0067329 A1 | 3/2015 | Ben Saied | |
| 2015/0113592 A1 | 4/2015 | Curtis et al. | |
| 2015/0113599 A1 | 4/2015 | Curtis et al. | |
| 2015/0181024 A1* | 6/2015 | El Mghazli .......... H04B 1/3816 455/411 |
| 2015/0237031 A1 | 8/2015 | Neuman | |
| 2015/0244696 A1 | 8/2015 | Ma | |
| 2015/0304110 A1 | 10/2015 | Oberheide | |
| 2016/0065556 A1 | 3/2016 | Sasin et al. | |
| 2016/0072808 A1 | 3/2016 | David et al. | |
| 2016/0191489 A1 | 6/2016 | Curtis et al. | |
| 2017/0019427 A1 | 1/2017 | Vank | |
| 2018/0324168 A1 | 11/2018 | Curtis et al. | |

FOREIGN PATENT DOCUMENTS

| | | |
|---|---|---|
| WO | 2011/123329 | 10/2011 |
| WO | 2013/049292 | 4/2013 |
| WO | 2014/116152 | 7/2014 |

OTHER PUBLICATIONS

Examination Report for GB Application No. 1604451.3 dated Jul. 15, 2020, 4 pages.
Examination Report for GB Application No. 1604447.1 dated Jul. 15, 2020, 5 pages.
U.S. Appl. No. 16/159,155, filed Oct. 12, 2018, Inventor: David et al.
Final Office Action dated Apr. 17, 2020 for U.S. Appl. No. 16/159,155, 17 pages.
Office Action dated Oct. 1, 2019 for U.S. Appl. No. 16/159,155, 19 pages.
Second Office Action dated May 17, 2019 for Chinese Application No. 201480056752.8, 9 pages.
Office Action for KR Application No. 10-2019-7012706 dated Feb. 12, 2020 and English translation, 13 pages.
Office Action for KR Application No. 10-2016-7012709 dated Feb. 14, 2020 and English translation, 10 pages.
Search Report dated Mar. 18, 2015 for GB Application No. 1415861.2, 3 pages.
First Office Action dated Dec. 29, 2018 in CN Application No. 201480056752.8 and English translation, 39 pages.
U.S. Appl. No. 16/035,765, filed Jul. 16, 2018, Curtis et al.
Final Office Action dated Jan. 29, 2020 in U.S. Appl. No. 16/035,765, 13 pages.
Office Action dated Aug. 7, 2020 for U.S. Appl. No. 16/159,155, 17 pages.
Office Action dated May 15, 2020 in U.S. Appl. No. 16/035,765, 12 pages.
U.S. Appl. No. 14/056,423, filed Oct. 17, 2013; Inventor: Curtis et al.
U.S. Appl. No. 15/060,639, filed Mar. 4, 2016; Inventor: Curtis et al.
Office Action dated Sep. 22, 2017 in co-pending U.S. Appl. No. 15/060,639, 28 pages.
Internet Citation, ZigBee Smart Energy, Custom Device Certification Authority, http://www.certicom.com/index.php/device-authentication-service/smart-energy-device-certificate-service (Oct. 1, 2013), printed on Oct. 16, 2013, 2 pages.

(56) References Cited

OTHER PUBLICATIONS

HP Device Registration Repository Capability; M2M06-014 Device Registry Repository Capability, ETSI Draft; M2M06-014 Device Registry Repository Capability, European Telecommunications Standards Institute, 650, Route Des Lucioles; F-06921 Sophia-Antipolis; France, vol. SmartM2M, Oct. 13, 2009, pp. 1-2. XP014207713.
Partial International Search Report for PCT/GB2014/053098 dated Jan. 29, 2015, 5 pages.
International Search Report and Written Opinion for PCT/GB2014/053096 dated Jan. 30, 2015, 12 pages.
International Search Report and Written Opinion for PCT/GB2014/053097 dated Jan. 30, 2015, 15 pages.
International Search Report and Written Opinion for PCT/GB2014/053098 dated Apr. 8, 2015, 20 pages.
Office Action dated Oct. 22, 2015 in co-pending U.S. Appl. No. 14/056,423, 23 pages.
International Preliminary Report on Patentability dated Apr. 28, 2016 in PCT/GB2014/053098, 14 pages.
International Preliminary Report on Patentability dated Apr. 28, 2016 in PCT/GB2014/053097, 10 pages.
International Preliminary Report on Patentability dated Apr. 28, 2016 in PCT/GB2014/053096, 9 pages.
Final Office Action dated May 20, 2016 in co-pending U.S. Appl. No. 14/056,423, 23 pages.
Office Action dated Oct. 6, 2016 in co-pending U.S. Appl. No. 14/056,423 17 pages.
Final Office Action dated May 10, 2017 in co-pending U.S. Appl. No. 14/056,423, 18 pages.
Office Action dated Sep. 21, 2017 in co-pending U.S. Appl. No. 14/056,423, 19 pages.
U.S. Appl. No. 16/520,640, filed Jul. 24, 2019, Inventor: Curtis et al.
U.S. Appl. No. 16/520,739, filed Jul. 24, 2019, Inventor: Curtis et al.
U.S. Appl. No. 16/520,605, filed Jul. 24, 2019, Inventor: Curtis et al.
U.S. Appl. No. 16/520,424, filed Jul. 24, 2019, Inventor: Curtis et al.
Examination Report for GB Application No. 1604447.1 dated Dec. 3, 2020, 3 pages.
Examination Report for GB Application No. 1415861.2 dated Jan. 28, 2021, 4 pages.

\* cited by examiner

Sensor Architecture Options: Summary

Increasing complexity and cost →

| | Model 1: (FIG. 10) Fixed Trust Shared Secret | Model 2: (FIG. 11) Fixed Trust Raw public / private keypair | Model 3: (FIG. 12) Chained Trust Certificate, resettable |
|---|---|---|---|
| Paradigm | • Unique ID and pre-shared key | • Fixed, one-time PKI keypair<br>• AES sensor (session) key | • Multiple reloadable certificates<br>• AES sensor (session) key<br>• Registry issues first cert in factory. Later, it can add, delete certs.<br>• Registry can nominate new cert as "owner" and remove its own |
| Crypto examples | • AES | • PKI authentication<br>• AES payload encryption<br>• Optional on-chip keypair gen | • PKI authentication<br>• Multiple certificates<br>• AES payload encryption<br>• Optional on-chip keypair creation |
| Key source examples | • Manufacturing server | • Manufacturing server<br>• Optional on-chip keypair gen | • Manufacturing server<br>• Registry (for new keys)<br>• Optional on-chip keypair gen |
| Possible attacks? | • Manufacturing key injection<br>• Handling of shared key manifests<br>• Platform robustness<br>• Registry service integrity | • Manufacturing key injection (unless generated on-chip)<br>• Keypair strength<br>• Platform robustness<br>• Registry service integrity | • Manufacturing key injection (unless generated on-chip)<br>• Keypair strength<br>• Platform robustness<br>• Registry service integrity |
| Example products | • Weather sensors<br>• Disposable sensors<br>• Toys | • Personal fitness devices<br>• Home controls<br>• Automotive, telematics | • Healthcare<br>• Public infrastructure<br>• Industrial |

FIG. 13

ASSIGNING AN AGENT DEVICE FROM A FIRST DEVICE REGISTRY TO A SECOND DEVICE REGISTRY

CROSS-REFERENCE

This application is a continuation of U.S. application Ser. No. 15/060,639 filed Mar. 4, 2016, which is a continuation of U.S. application Ser. No. 14/056,459 filed Oct. 17, 2013 (now U.S. Pat. No. 9,307,405), the entire contents of which are incorporated herein by reference in this application.

TECHNICAL FIELD

The present invention relates to the field of data processing. More particularly, the invention relates to a method of assigning an agent device from a first device registry to a second device registry.

BACKGROUND

There are ever increasing numbers of devices within the home, other buildings or the outdoor environment that have processing and communication capabilities which allow them to interact with other processing devices. Everyday objects and relatively small scale processing devices may be connected to each other and to central platforms as part of the "Internet of Things". For example, a sprinkler system in the home may gather information from various moisture sensors and control the activation of sprinklers based on the moisture information. Also, a healthcare provider may use wireless sensors (e.g. a heart rate monitor or a sensor for monitoring that a patient is taking their prescribed medicine) to track the health of patients while at home.

Hence, in a variety of applications, there may be a central application providing apparatus which interacts with one or more agent devices which provide data to the application providing apparatus and/or are controlled by the application providing apparatus. The agent devices may differ considerably in terms of complexity, processing resources, hardware and purpose. It can be important to provide trust between the agent device and the application providing apparatus so that the application provider can trust the validity of the data received from the agent device and the agent device can trust any commands received from the application providing apparatus. However, since many agent devices in the Internet of Things may have little processing capability, providing resources in the agent device for establishing the trusted relationship with the application providing apparatus can be difficult and may significantly increase the cost of the agent device. The rapid and wide deployment of such agent devices means there is also a desire to make installation as quick and efficient as possible.

SUMMARY

Viewed from one aspect, the present invention provides a method for assigning an agent device, which is registered in a first device registry maintained by a first registry apparatus for authenticating agent devices for communicating with one or more first application providing apparatuses, to a second device registry maintained by a second registry apparatus for authenticating agent devices for communicating with one or more second application providing apparatuses, wherein the first device registry comprises first authentication information for authenticating the identity of the agent device; the method comprising:

(a) the first registry apparatus receiving from a requestor device a device assignment request requesting that the agent device is assigned to the second device registry;

(b) in response to the device assignment request, the first registry apparatus checking whether the agent device is allowed to be assigned to the second device registry in response to the device assignment request from the requestor device;

(c) if the agent device is allowed to be assigned to the second device registry, the agent device transmitting to the second registry apparatus second authentication information for authenticating the identity of the agent device; and (d) the second registry apparatus registering the second authentication information for the agent device in the second device registry.

A registry apparatus may be provided to manage trusted relationships between agent devices and application providing apparatuses. For example, the registry apparatus may store authentication information for agent devices and may manage authentication of the agent devices using the authentication information. The registry may also perform tasks such as, for example, providing application keys for establishing trusted communication between an agent device and an application providing apparatus. Using a registry apparatus in this way can provides several advantages such as allowing agent devices and application providing apparatuses provided by different manufacturers or providers to trust each other so that they are not restricted to communicating with apparatuses from the same manufacturer. Also, using the registry to coordinate authentication and establish trusted communication can simplify the resources of the agent devices as they do not need to be responsible for establishing trust with the application providing apparatus.

The present technique recognises that it can be useful to provide more than one device registry maintained by different registry apparatuses. For example, a private registry may be operated by an organization such as a government so that it can securely manage communication with its agent devices separately from other agent devices that are registered in a public registry. Different application providing apparatuses may similarly be associated with different registries. To expand, change or restrict the range of application providers with which a particular sensor can communicate, it can be useful to allow a device registered with one device registry to be assigned to a second device registry. However, to maintain trust in the agent device, it can be important to do this securely. A secure assignment procedure can be achieved by requiring a device assignment request to be transmitted to the first registry apparatus which currently holds the registration of the agent device, which triggers the first registry apparatus to check whether the agent device is allowed to be assigned to the second device registry in response to the device assignment request.

The first registry apparatus may maintain first authentication information for authenticating the identity of the agent device. When the device is assigned to the second device registry then the device sends second authentication information to the second registry apparatus for registering in the device registry. In some examples, the second authentication information may be the same as the first authentication information so that the second registry receives exactly the same information as was originally registered in the first registry. For example, the agent device may not have any capability of generating new authentication information and so it may simply send its original authentication information to the second registry. In this case, following the assignment, the agent device may for example be registered in both the first registry and the second registry and can be authenticated by either registry using the same authentication information. This can be useful for expanding the range of application providing apparatus with which the agent device can enter trusted communication.

In other examples, the second authentication information may be different to the first authentication information. For example, the agent device may have authentication information generating circuitry for generating the second authentication information, so that new authentication information is generated upon assignment to the second registry. For example, the second authentication information may be a new key for encrypting messages from the agent device to verify its identity. This allows the agent device to be provided with a new trusted cryptographic identity so that it no longer can be authorised by the first registry once it has been transferred to the second registry.

After determining that the agent device is allowed to be assigned to the second device registry, the first registry apparatus may delete the first authentication information for the agent device from the first device registry, to ensure that the agent device can no longer be authenticated by the first registry. Alternatively, the agent device may have regenerated its authentication information and may no longer hold any authentication information corresponding to the first authentication information. In this case, it may not be essential for the first registry apparatus to delete the first authentication information since in any case the agent device can no longer be authenticated using the first authentication.

In one example, the first authentication information may comprise a symmetric key which is the same as a corresponding key held by the agent device, and the second authentication information may similarly comprise a symmetric key corresponding to a corresponding key in the agent device (with the second authentication information being the same or different to the first authentication information as discussed above). However, additional security can be achieved by embodiments in which the agent device holds a private key and the first or second authentication information comprises a public key which corresponds to the private key held by the agent device. In these embodiments, the asymmetric nature of the keys means that only the agent device may have access to the private keys and the public keys held by the registry do not expose the private keys held by the agent device even if they are leaked to other devices.

For example, the agent device may originally hold a first private key and a corresponding first public key may be registered with the first registry. When being assigned to the second registry, the agent device may generate a new keypair comprising a second private key and second public key, retain the second private key, and transmit the second public key to the second registry apparatus for registering in the second registry. If the agent device deletes the first private key after transmitting the second authentication information to the second registry apparatus, then following the assignment the first public key held by the first registry apparatus becomes useless since there is no longer a corresponding first private key to be verified using the first public key. In this case, from a security point of view it is not essential for the first registry apparatus to delete the first public key from the first device registry, although to conserve storage capacity the first registry apparatus may still delete the registry entry for the agent device.

When transmitting the second public key to the second registry apparatus, the agent device may transmit a digital certificate comprising the public key and then the second registry apparatus may sign a digital certificate. Hence, the second registry apparatus can effectively act as a certifying authority for the digital certificate comprising the public key to verify that the public key actually comes from the agent device. For example, X.509 certificates may be used as the digital certificate.

If the first registry apparatus determines that the agent device is allowed to be assigned to the second device registry, there may be various ways in which the agent device can be triggered to send the second authentication information to the second registry apparatus. The first registry apparatus may inform the device itself that it is being assigned to a different registry and the device may then respond by transmitting the second authentication information to the second registry apparatus. Also, the first registry apparatus may inform another device such as the second device registry or the requestor device which issued the device assignment request that the assignment has been approved, and this device may then trigger the agent device to transmit the second authentication information.

The generation or deletion of authentication information by either the agent device or the first registry apparatus may be performed as an atomic operation. This means that the generation or deletion of keys must proceed such that the operation as a whole either succeeds completely or fails completely, and so it is not possible to partially perform the atomic operation. This is analogous to atomic transactions in databases which either succeed or fail and cannot be partially successful. By performing the regeneration of key information or other authentication information as an atomic operation, this ensures that the agent device will always have appropriate authentication information for verifying its identity with either the first registry or the second registry, so that is not possible to end up with no authentication information or invalid authentication information, which could lead to loss of the ability to verify the identity of the agent device. The atomic operation can be enforced for example by taking a backup of the original authentication information before the generation or deletion of key information begins, and then restoring the backup if any problems occur before the atomic operation is complete.

In some cases, the requestor device which makes a device assignment request may be a third party device separate from both the first registry and the second registry. For example, in the context of a smart connected city which has its own private registry as a second device registry, another device within the city, such as a platform operated by the city management, may make the assignment request to request that the device is assigned to the second registry.

In other examples, the requested device may comprise the second registry apparatus itself, so that the second registry apparatus issues the device assignment request at the first registry apparatus to request that the device is assigned to the second registry held by the same apparatus.

The first registry apparatus may check whether the agent device is allowed to be assigned to the second device registry in different ways. In one example, the first registry apparatus may authenticate the requestor device to check that the requestor device is trusted and allowed to request assignment of agent devices to another registry. For example, the first registry apparatus may exchange messages with the requested device to verify the identity of the requestor device. Alternatively, the first registry apparatus may already have authenticated certain requested devices and may simply check whether the requested device has already been authenticated. Hence, it is not necessary to actually perform the authentication at the time of receiving the device assignment request.

Also, not all agent devices may support being assigned to different registry. For example, for security reasons some agent devices may be restricted to being registered with a single registry. Also, some agent devices may not support key generation and therefore may not be allowed to transferred to a different registry so that only one registry has the credentials to authenticate the agent device. Other agent devices may be less security-critical and so even if they do not have key generation capability, assignment of the device to a different registry may still be allowed with the same authentication information being provided to both registers. Hence, the checking of whether the agent device is allowed to be assigned to the second device registry may also include checking that the agent device actually supports assignment to the second device registry. For example, the first registry may include metadata for each trusted device indicating whether that device is allowed to be assigned to a different registry.

The checking may also include other operations. For example, if multiple requests are received for the same agent device corresponding to different target device registries then there may be some checking of a priority associated with each target registry to determine which registry the device should be assigned to. The checking may also include a mixture of all of the different kinds of checks described above.

The agent device may store an address of the registry apparatus which currently holds its registration. The address may be any information which allows the agent device to contact the registry apparatus, such as a URL (uniform resource locator) or IP address (internet protocol address), for example. During the assignment, the first registry apparatus, the second registry apparatus or the requestor device may transmit to the agent device an address of the second registry apparatus and the agent device may then update its stored copy of the address so that it can subsequently communicate with the second registry apparatus. Hence, the assignment process may include updating of the contact information for contacting the registry.

Following an assignment of the agent device to the second device registry, it may later be desirable to return the registration of the agent device to the first device registry. Hence, the first registry apparatus may receive a reset request (either from the second registry apparatus or another requesting device). In response to the reset request, the first registry apparatus may check whether the agent device is allowed to be reassigned to the first device registry, and if so, the agent device may be triggered to transmit the third authentication information to the first registry apparatus for registering in the first device registry. The third authentication information may be the same as the first or second authentication information or could be newly generated authentication information. Hence, if the second device registry no longer wishes to register the device then it can be returned to its original registry.

The assignment of the agent device from the first device registry to the second device registry may be carried out without any intervention from the user of the agent device. There is no need for any user interface to be provided at the agent device for coordinating the assignment of the device to the second registry. Instead, the first registry apparatus, second registry apparatus and/or the requestor device may control the transmission of the second authentication information from the agent device without the user being involved. The user need not even be aware that his/her device is being transferred to a different registry.

Viewed from another aspect, the present invention provides a first registry apparatus for authenticating agent devices for communicating with one or more application providing apparatuses, comprising:

storage circuitry configured to store a first device registry of agent devices, the first device registry comprising authentication information for authenticating the identity of the agent devices;

communication circuitry configured to receive, from a requestor device, a device assignment request requesting that a specified agent device registered in the first device registry is assigned to a second device registry of agent devices maintained by a second registry apparatus;

processing circuitry configured to check whether the specified agent device is allowed to be assigned to the second device registry in response to the device assignment request, and if the specified agent device is allowed to be assigned to the second device registry, configured to control the communication circuitry to instruct at least one of the specified agent device, the requestor device and the second registry apparatus that the specified agent device can be assigned to the second device registry.

Hence, the first registry apparatus which currently holds the registration for a particular agent device may receive a device assignment request and check whether the device is allowed to be assigned to a second device registry and then trigger one of the agent device, the requestor device and the second registry apparatus to carry out the assignment.

Viewed from a further aspect, the present invention provides a first registry apparatus for authenticating agent devices for communicating with one or more application providing apparatuses, comprising:

storage means for storing a first device registry of agent devices, the first device registry comprising authentication information for authenticating the identity of the agent devices;

communication means for receiving, from a requestor device, a device assignment request requesting that a specified agent device registered in the first device registry is assigned to a second device registry of agent devices maintained by a second registry apparatus;

processing means for checking whether the specified agent device is allowed to be assigned to the second device registry in response to the device assignment request, and if the specified agent device is allowed to be assigned to the second device registry, for controlling the communication means to instruct at least one of the specified agent device, the requestor device and the second registry apparatus that the specified agent device can be assigned to the second device registry.

Viewed from another aspect, the present invention provides a method for a first registry apparatus for maintaining a first device registry of agent devices for communicating with one or more application providing apparatuses, the first device registry comprising authentication information for authenticating the identity of the agent devices; the method comprising steps of:

receiving, from a requestor device a device assignment request requesting that a specified agent device registered in the first device registry is assigned to a second device registry of agent devices maintained by a second registry apparatus;

checking whether the specified agent device is allowed to be assigned to the second device registry in response to the device assignment request; and if the specified agent device is allowed to be assigned to the second device registry, instructing at least one of the specified agent device, the requestor device and the second registry apparatus that the specified agent device can be assigned to the second device registry.

Viewed from yet another aspect, the present invention provides a first registry apparatus for authenticating agent devices for communicating with one or more application providing apparatuses, comprising:

storage circuitry configured to store a first device registry of agent devices, the first device registry comprising authentication information for authenticating the identity of the agent devices;

communication circuitry configured to transmit a device assignment request to a second registry apparatus for maintaining a second device registry of agent devices, the assignment request requesting that a specified agent device registered in the second device registry is assigned to the first device registry; and processing circuitry configured to register in the first device registry authentication information received from the specified agent device for authenticating the identity of the specified agent device.

Therefore, a registry apparatus which does not currently hold the registration for an agent device can request that the agent device is transferred to its own registry. When authentication information is received from the agent device then this is registered in the device registry for future authentication of the agent device.

Viewed from another aspect, the present invention provides a first registry apparatus for authenticating agent devices for communicating with one or more application providing apparatuses, comprising:

storage means for storing a first device registry of agent devices, the first device registry comprising authentication information for authenticating the identity of the agent devices;

communication circuitry for transmitting a device assignment request to a second registry apparatus for maintaining a second device registry of agent devices, the assignment request requesting that a specified agent device registered in the second device registry is assigned to the first device registry; and processing means for registering in the first device registry authentication information received from the specified agent device for authenticating the identity of the specified agent device.

Viewed from another aspect, the present invention provides a method for a registry apparatus for maintaining a first device registry of agent devices for communicating with one or more application providing apparatuses, the first device registry comprising authentication information for authenticating the identity of the agent devices; the method comprising steps of:

transmitting a device assignment request to a second registry apparatus for maintaining a second device registry of agent devices, the assignment request requesting that a specified agent device registered in the second device registry is assigned to the first device registry;

receiving authentication information from the specified agent device; and registering in the first device registry the authentication information received from the specified agent device.

Viewed form a further aspect, the present invention provides an agent device for communicating with one or more application providing apparatuses, comprising:

processing circuitry configured to perform authentication with a first registry apparatus based on first authentication information registered for the agent device in a first device registry maintained by the first registry apparatus;

authentication information generating circuitry configured, in response to a device assignment request to assign the agent device to a second device registry of agent devices maintained by a second registry apparatus, to generate second authentication information for authenticating the identity of the agent device; and communication circuitry configured to transmit the second authentication information generated by the authentication information generating circuitry to the second registry apparatus for registering in the second device registry.

When receiving a device assignment request (which may come from either the first registry apparatus, the second registry apparatus or another device such as the requestor apparatus described above), the agent device is triggered to generate second authentication information for authenticating its identity. The second authentication information is then transmitted to the second registry apparatus to which the device is to be assigned.

Viewed from another aspect, the present invention provides an agent device for communicating with one or more application providing apparatuses, comprising:

processing means for performing authentication with a first registry apparatus based on first authentication information registered for the agent device in a first device registry maintained by the first registry apparatus;

authentication information generating means for generating, in response to a device assignment request to assign the agent device to a second device registry of agent devices maintained by a second registry apparatus, second authentication information for authenticating the identity of the agent device; and communication means for transmitting the second authentication information generated by the authentication information generating means to the second registry apparatus for registering in the second device registry.

Viewed from a further aspect, the present invention provides a method for an agent device for communicating with one or more application providing apparatuses, comprising:

performing authentication with a first registry apparatus based on first authentication information registered for the agent device in a first device registry maintained by the first registry apparatus;

receiving a device assignment request to assign the agent device to a second device registry of agent devices maintained by a second registry apparatus;

in response to the device assignment request, generating second authentication information for authenticating the identity of the agent device; and transmitting the second authentication information to the second registry apparatus for registering in the second device registry.

Further aspects, features and advantages of the present technique will be apparent from the following description which is to be read in conjunction with the accompanying drawings.

BRIEF DESCRIPTION OF THE DRAWINGS

FIG. 13 is a table comparing different properties of the authentication models shown in FIGS. 10 to 12;

DESCRIPTION OF EXAMPLE EMBODIMENTS

Figure 1:
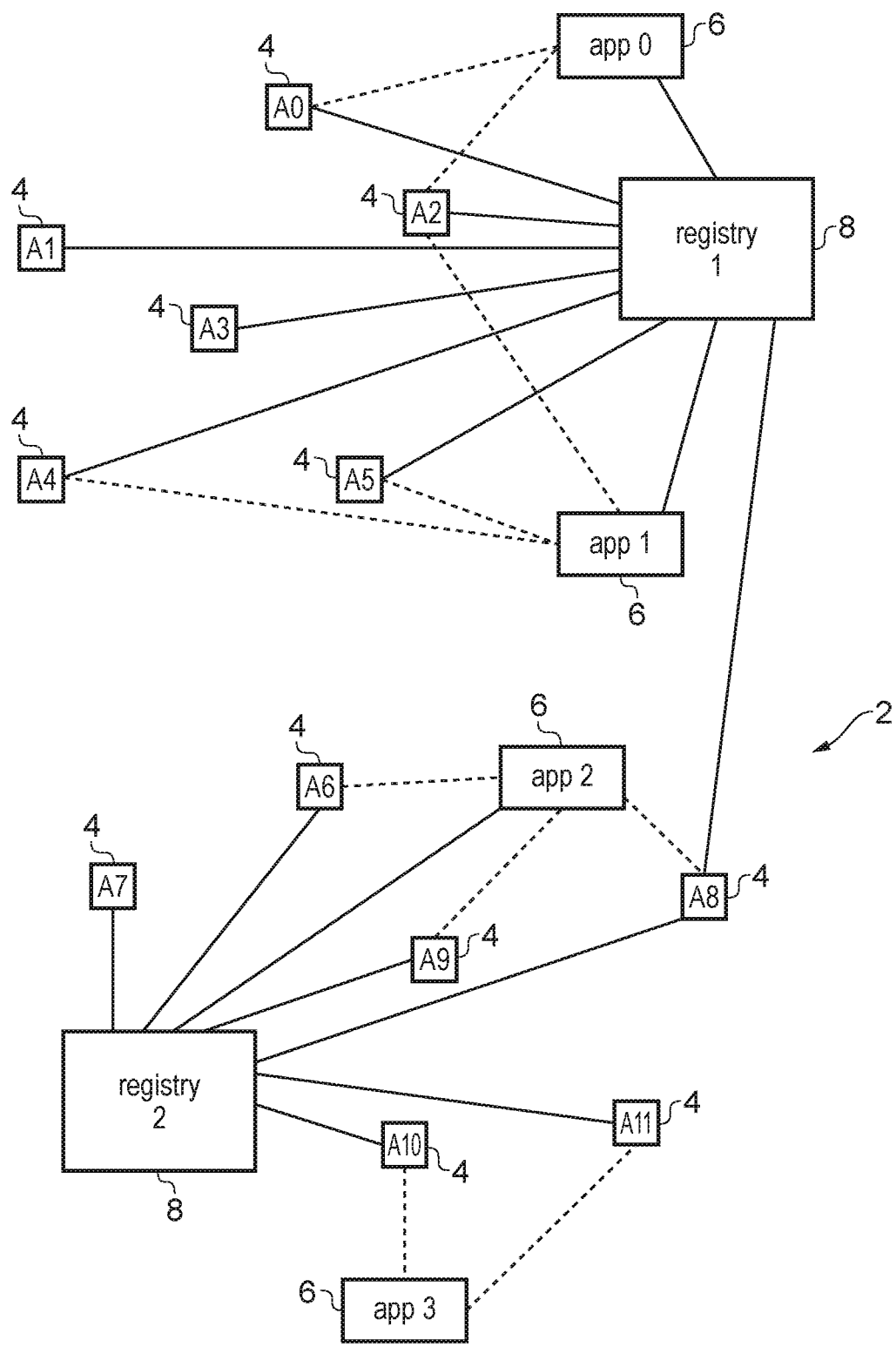
FIG. 1 schematically illustrates an example of a system comprising at least one registry apparatus for establishing trusted communication between agent devices and application providing apparatuses.

FIG. 1 illustrates an example of a system 2 comprising of a number of agent devices 4, application providing apparatuses 6 and registry apparatuses 8. The application providing apparatuses 6 may comprise any device which provides a cloud service or executes an application program using data gathered from one or more agent devices 4 and/or issues commands for controlling one or more agent devices 4. The agent devices 4 may be any device which gathers data for transmitting to an application providing apparatus 6 or which is controlled by the application providing apparatus 6. For example, the agent devices 4 may be connected devices in the Internet of Things (IOT), such as wireless sensors and actuators. Although the agent devices 4 can comprise larger scale processing devices such as a tablet computer or mobile telephone, often the agent devices 4 may comprise relatively small scale devices which perform only a limited set of tasks, such as sensors collecting sensing data and feeding it back to an application, or a relatively simple control unit which controls an associated object such as a sprinkler, swimming pool pump or air conditioning unit. The agent devices 4 may communicate with other devices (such as the application providing apparatuses 6 and registry apparatuses 8) using wired or wireless communication, which could be via an Internet connection. In the present application, the term "sensor" will sometimes be used as an example of an agent device, but it will be appreciated that the agent devices may also comprise devices which can perform tasks other than sensing.

The agent devices 4 and application providing apparatuses 6 communicate by encrypted communication. To help establish such encrypted communication, one or more registry apparatuses 8 are provided for maintaining a trusted agent device registry which stores information about trusted agent devices 4. The registry 8 facilitates the automated secure pairing of agent devices 4 with application providing apparatuses 6, so that applications can trust the authenticity and data integrity of an agent device 4 and the agent devices 4 can trust the authenticity and command integrity of the application 6 even if the application and agent devices are provided by different manufacturers, suppliers or distributors. The registry 8 also simplifies the configuration of the trusted communication between the agent devices 4 and the application 6, so that the agent devices 4 do need to know specific details of the applications with which they are communicating and the users of the agent devices 4 do not need to perform configuration operations to establish communication with the application. Instead, when activated the agent devices 4 can simply contact the registry 8 which can then configure the agent device 4 and application 6 to communicate with each other.

As shown in FIG. 1, multiple registry apparatuses 8 may be provided, each in contact with a different set of agent devices 4 and application providers 6. As shown in FIG. 1, it is possible for an agent device A8 to be registered with more than one registry. Similarly, an application providing apparatus 6 could be in contact with multiple registries. Also, while most agent devices 4 would communicate with a single application providing apparatus 6, it is also possible for a registry to configure an agent device 4 to communicate with multiple application providers (for example see agent device A2 in FIG. 1).

The function of the agent devices 4 and the application providing apparatuses 6 may vary considerably for different applications. For example, the agent devices 4 may gather meteorological data to be communicated to an application provider 6 which runs a weather application which performs forecasting based on the data gathered by the agent devices 4. Also, some agent devices 4 may gather information about a user's fitness program, such as heart rate, distance covered, etc., and this could be fed back to a fitness monitoring application maintained by an application provider 6. In another example, a home air conditioning system may comprise a central monitoring application 6 and a number of agent devices 4 such as temperature sensors, humidity sensors, user configuration panels, and air conditioning control units, with the central application controlling the operation of the air conditioning control units based on the sensing of the sensors and the user's preferences as set in the user configuration panel. There are many more applications which may use an application providing apparatus 6 and one or more agent devices 4 in a similar way. For example, there may be applications in home security, home or street lighting, utility provision, building automation, policing, asset tracking and logistics, etc. The registry 8 provides a common architecture for managing authentication and trust between Internet of Things devices and applications 6.

Figure 2:
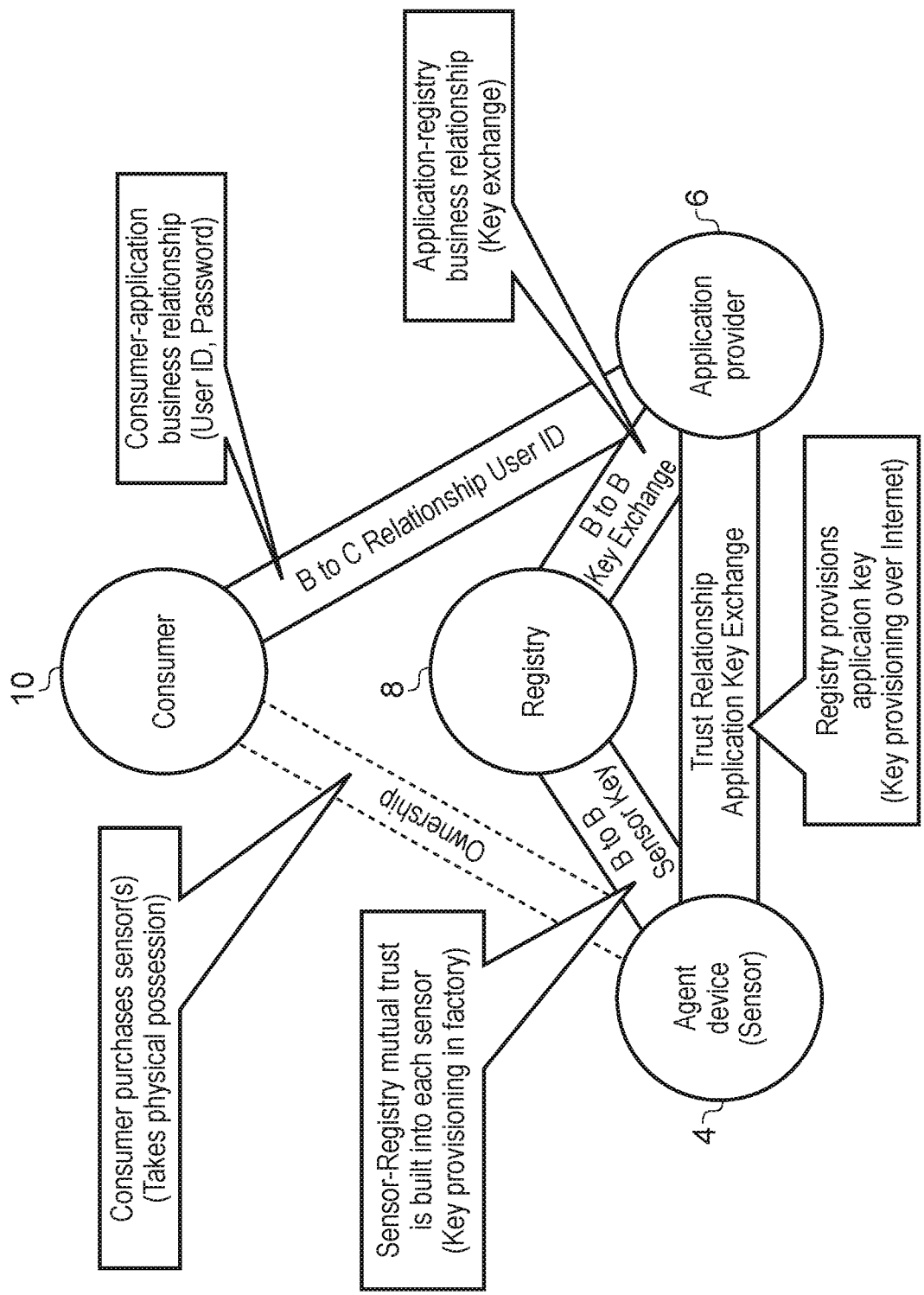
FIG. 2 illustrates an example of relationships between an agent device, an application provider, a device registry and a consumer.

FIG. 2 schematically illustrates an example of the relationships between an agent device 4, an application provider 6, a registry 8 and a consumer 10. The consumer 10 has physical ownership of the agent device 4. The consumer 10 also has a business relationship with the application provider 6. For example the application provider may have established a user profile of the consumer 10 using a user ID and password. The consumer in this context may be a person, household or company for example.

The agent device 4 (e.g. a sensor) incorporates authentication information for authenticating itself with the registry 8. For example, the agent device 4 may have a key which can be used to prove its identity. Hence the registry 8 can check the identity of the agent device 4 and verify that it is a trusted agent device. Similarly, the registry 8 and the application provider 6 may exchange keys to verify each other's identity and establish a trusted relationship. When the registry 8 has established trust with both an agent device 4 and the application providing apparatus 6, then the registry 8 can provision an application key to both the agent device 4 and the application providing apparatus 6. The application key provided by the registry 8 is then used to encrypt communication between the agent device 4 and application provider 6 without any need for communication via the registry 8. Hence, the registry 8 facilitates establishment of a trusted communication between the agent device 4 and the application provider 6, without the agent device 4 and application provider 6 needing to directly establish trust between themselves. This is useful because often the agent devices 4 may be small, ultra low powered devices (such as a temperature sensor or heart rate monitor) with little processing capability for implementing protocols and cryptographic algorithms for verifying identity of the application provider 6. Also, often the person installing an agent device 4 may not have the knowledge or information to perform complicated configuration applications for establishing the trusted communication with the application provider 6. The registry removes the need for the user or installer of the agent device 4 to know how to configure the trusted communication.

Note that in FIG. 2 there is no relationship between the consumer 10 and the registry 8. The registry 8 does not have any details about the consumer such as user ID or password and therefore no personal details are transmitted and stored by the registry. The consumer's relationship 10 is solely with the application provider 6. The registry 8 communicates only with agent devices 4 and the application provider 6 and not the consumer 10. Hence the registry 8 is a neutral platform for establishing trust between agent devices and applications. Once the trusted communication has been established between the agent devices 4 and applications 6 then the communication proceeds directly between the agent device and application without the registry being involved.

In other examples, there may not be a consumer 10 as shown in FIG. 2 and instead the agent device 4 may belong to the same organisation that operates the application providing apparatus 6. For example, a smart connected city may have Internet of Things devices located around the city for monitoring street lighting, traffic flow, or waste collection, for example, and the city management may own both the agent devices 4 that provide sensing data, and one or more application providing apparatuses 6 for monitoring the data obtained by the agent devices 4 and processing this data (for example, the application could provide a cloud platform which residents of the city can access to check status and report problems). In this case, there might not be a consumer 10 associated with a particular agent device 4 as shown in FIG. 2. Nevertheless, the use of the registry 8 simplifies installation of the agent devices 4. A contractor installing an agent device 4 in a street light, or waste bin, for example, would not need to know how to configure the agent device 4 to communicate with the application receiving the data from the agent device 4. Instead, on activation of the agent device 4 (for example on power up or deployment of the agent device) the agent device can automatically communicate with the registry 8 to set up the trusted relationship with the application 6.

Figure 3:
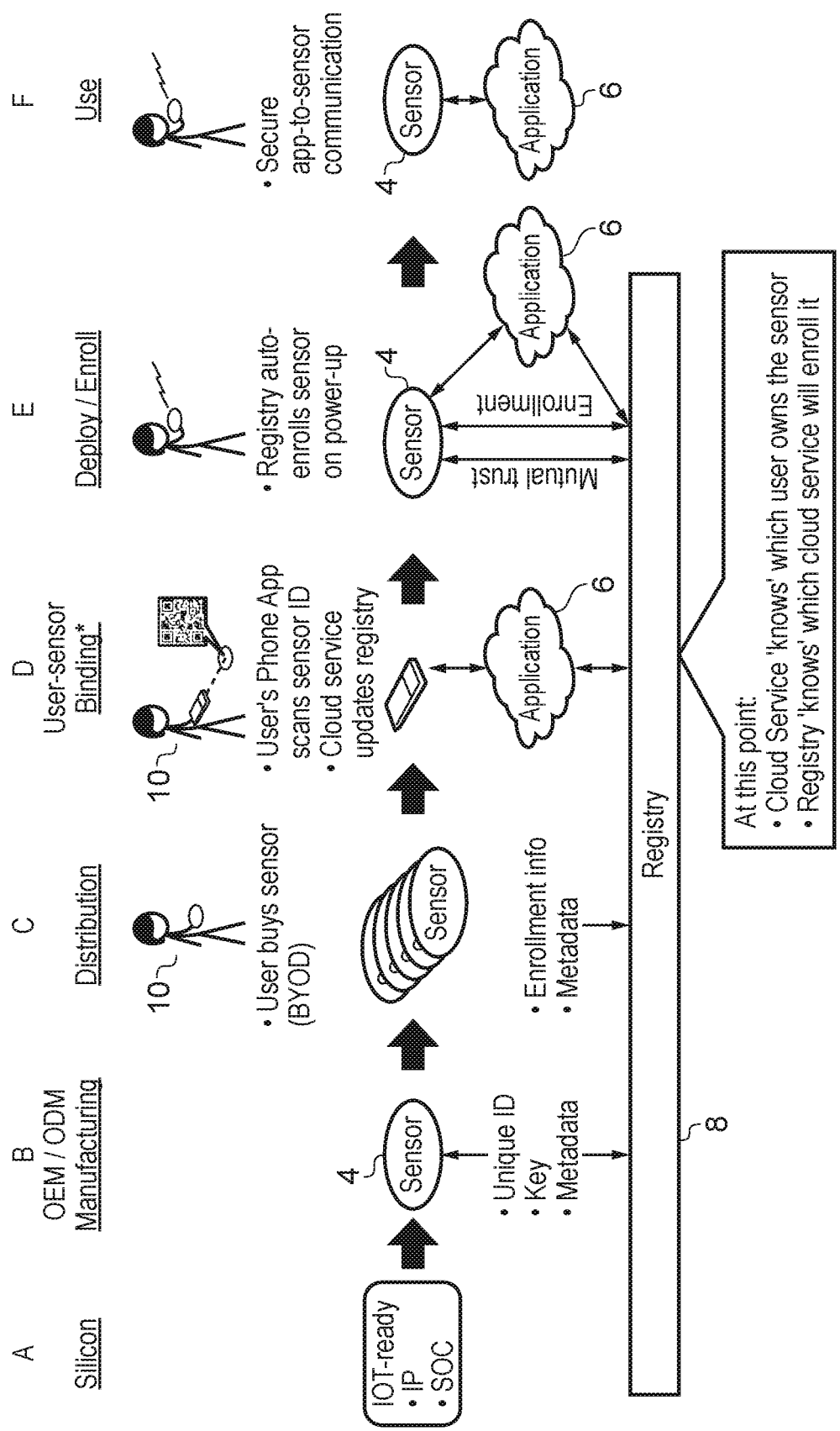
FIG. 3 illustrates an example timeline showing the progress of an agent device through its lifespan from its manufacture to its use with applications.

FIG. 3 shows an example timeline showing progress of an agent device (sensor) 4 from its manufacture through its registration and authentication with the registry 8 until communication is established with the application provider 6. At step A, a system on chip (SOC) for the agent device is manufactured in silicon. At step B, an original equipment manufacturer (OEM) and/or original device manufacturer (ODM) manufactures the agent device 4 using the system on chip. At some point during the manufacturing, a unique device identifier is embedded in the agent device 4 together with key information for authenticating the agent device's identity and other metadata about the agent device. At step C, the agent device is distributed. For example, the user 10 can buy an agent device 4 from a shop or the agent device may be provided to an organisation such as a weather forecaster or a city government. Either during the manufacturing at step B or the distribution at step C, enrolment information is provided to the registry 8 to register the agent device 4 in the registry 8 as a trusted agent device. The registry 8 can be provided with key information for verifying that the agent device 4 is trusted, as well as other metadata about the agent device 4.

At this point, the registry 8 knows that the agent device 4 having the unique ID is a trusted agent device, but does not yet know which cloud service application will use the data from the agent device 4. Hence, at step D a binding operation is performed to link the user 10, the agent device 4 and the cloud application 6. For example, the agent device may have some kind of device identifier on it, such as a reference number, a barcode or a QR code (Quick Response code). The application provider 6 may provide a web interface or a smart phone or tablet app for entering the device identifier or scanning the barcode or QR code and uploading the device identifier to the application provider 6 together with the user's identifier. Alternatively this may be performed by the application provider on registration of a consumer with the application provider and subsequent allocation and dispatch of the agent device to the user. At this point, the cloud service knows which user owns the agent device 4 and can then inform the registry 8 of the device identifier to be registered for use with that application 6, so that the registry now knows which application provider 6 should communicate with the agent device 4. In this way, the link between the agent device 4 and the application provider 6 can be established in the registry 8 without the user of the agent device 4 being aware that the registry exists 8, and without the agent device 4 needing to store information linking the agent device 4 to a particular cloud service or application provider 6.

At step E, the agent device is deployed, for example by installing it in situ as part of the Internet of Things, or by turning on the agent device for the first time. On activation of the agent device 4, the agent device 4 automatically contacts the registry 8 using a registry address stored within the agent device 4. The agent device 4 and registry 8 now mutually authenticate each other to establish trust, using the key information that was embedded in the agent device 4 at step B and registered with the registry 8 during enrolment at step B or C. If the mutual authentication is successful, then the registry 8 provides an application key to the agent device 4 and application provider 6 and at step F the agent device 4 and application provider 6 can then communicate securely by encrypting and decrypting messages using the application key received from the registry 8. Hence, the registry 8 enables trust to be set up between the agent device 4 and the application 6 without the agent device needing to perform any complicated configuration.

In summary, the registry 8 provides an architecture for managing authentication of trust between IOT devices (e.g. sensor) 4 and application providing apparatuses (cloud providers) 6. The registry 8 comprises a cloud platform which manages metadata about each application provider 6 and agent device 4, manages relationships between agent devices 4 and application providers 6, authenticates device identifiers, and automatically provides agent devices and applications with keys for enabling secure communication. The agent device 4 may be manufactured and designed according to specific design guidelines which ensure that an agent device 4 has a unique authenticable identity, secure key storage and cryptographic capabilities for securely maintaining trust, and predictable platform robustness. The agent device manufacturing support platforms may support key generation and insertion in the agent device 4 and management of key pairs as well as the interface with the registry.

This architecture helps to solve several problems in existing systems. By providing a unique identifier for each agent device, which is authenticated by the registry cloud service, agent devices can be uniquely identified to ensure trust. Preferably, the device identifiers may be globally unique, so that no two devices throughout the world share the same identifier. This means that manufacturing and assignment of device identifiers may be entirely independent of any subsequently used registry. However, it is also possible for device identifiers to be locally unique within a given registry or constellation of registries, with the same identifier being used for different devices in independent, non-interacting registries. Mutual authentication between the agent device 4 and application 6 is achieved so that applications trust the agent device authenticity and the agent devices trust the application authenticity, via an automatic enrolment process securely pairing the agent devices for the applications. Since the agent devices 4 and application 6 can now trust each other even if they were not manufactured or distributed by the same provider, this opens the market for the agent devices and applications so that it is not necessary to use particular brands of agent devices 4 provided by certain application providers 6 in order to achieve trust. Applications can trust a broad range of agent devices from multiple manufacturers and agent devices can trust a broad range of applications from multiple providers. This will help to reduce the cost of agent devices and applications and also to increase the usage of Internet of Things agent devices and applications. Also, the registry 8 helps to increase the application provider's confidence in the source of sensor data for "big data" applications, which process large amounts of data received from many sources. The value of information gathered for "big data" services depends on the validity of all the "little data" collected by individual agent devices 4. If the cloud service cannot trust its individual agent devices 4 then the conclusions obtained by the "big data" application also cannot be trusted, rendering the entire application pointless. The present technique helps to maintain trust in the overall information gathered by such applications. Also, the registry 8 can store agent device characteristics and other information such as the history of use of an agent device 4. This can be used to allow application providers 6 to target particular kinds of agent devices 4. For example, an application 6 may only wish to collect data from agent devices 4 which have certain minimum security requirements.

Figure 4:
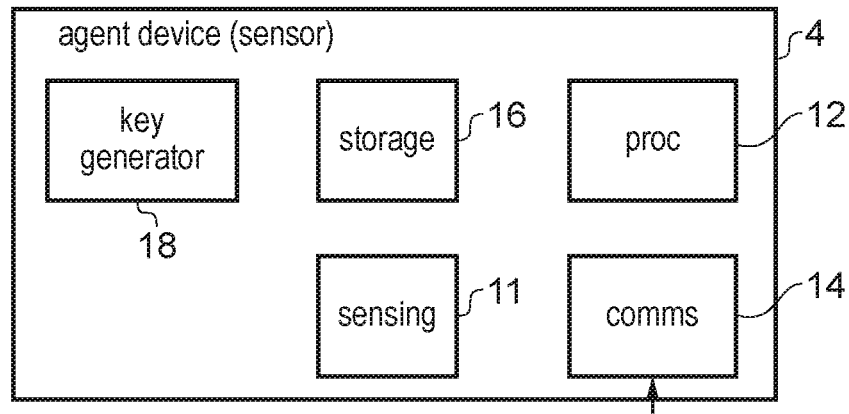
FIG. 4 schematically illustrates an example of an agent device.

FIG. 4 schematically illustrates an agent device 4. The agent device comprises sensing circuitry 11 for gathering sensing data. For example, the sensing circuitry 11 may comprise a temperature sensor, a camera, a heart rate monitor, or any other detector for gathering data required by the application provider 6. The agent device 4 also comprises processing circuitry 12 for controlling various processing operations performed by the agent device 4, such as mutual authentication, encryption of data sent to the application providing apparatus 6, and key generation for example. The agent device 4 also has communication circuitry 14 for communicating with the external devices such as the registry apparatus 8 and the application providing apparatus 6. The communication circuitry 14 may use a wireless communication, such as communication using wireless local area network (WiFi), short range communication such as radio frequency communication (RFID) or near field communication (NFC), or communications used in wireless sensor networks such as Zigbee or Bluetooth or 6LoWPAN. Also the communication circuitry 14 may use a cellular network such as 3G or 4G. The communication circuitry 14 may also use wired communication such as using a fibre optic or metal cable. The communication circuitry 14 could also use two or more different forms of communication, such as several of the examples given above in combination. The agent device also comprises storage circuitry 16 for storing the device identifier of the agent device 4, authentication information for authenticating the agent device, and other information used by the agent device 4. The agent device may optionally also comprise a key generator 18 for generating key information or other authentication information for the agent device 4.

While FIG. 4 shows an example in which the agent device is a sensor comprising sensing circuitry 11, in other examples the sensing circuitry 11 may not be essential. Instead, for example, the agent device may comprise control circuitry for controlling a physical object such as a sprinkler, burglar alarm, heating or air conditioning unit, or traffic light system, for example.

Figure 5:
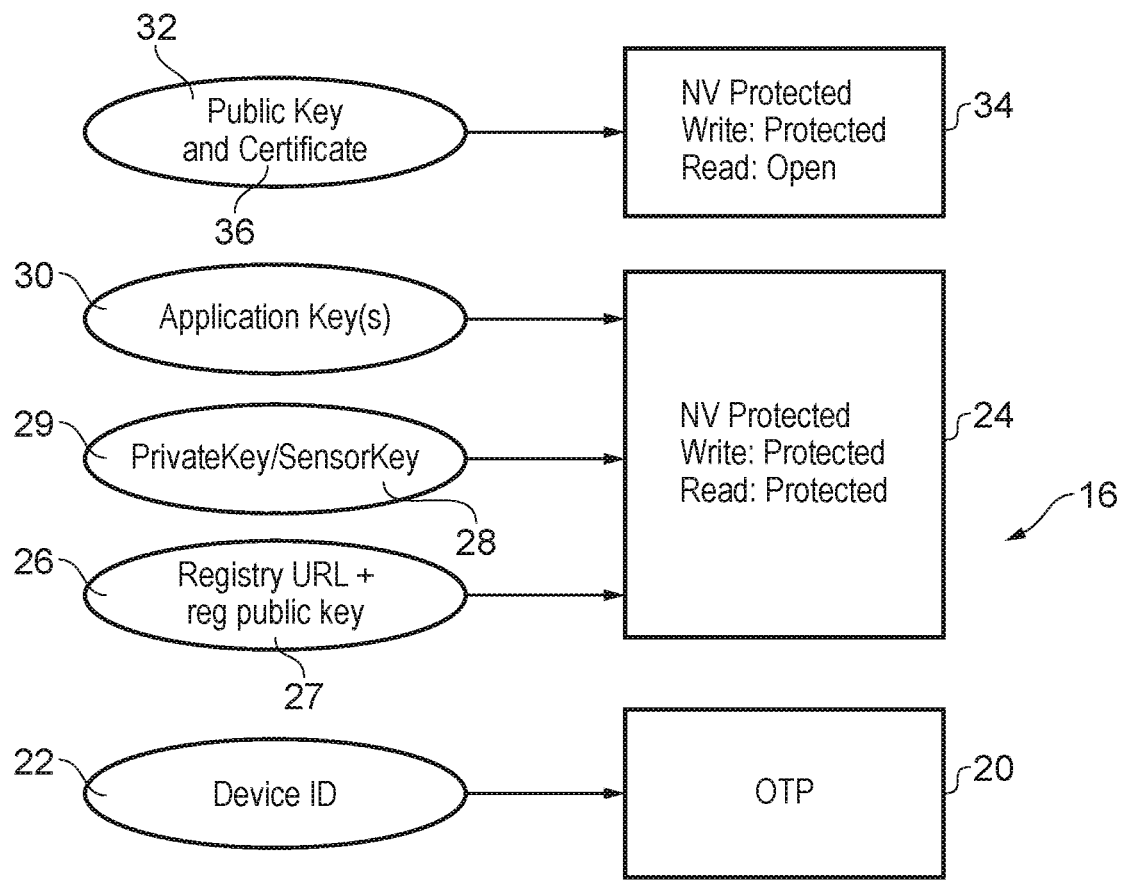
FIG. 5 schematically illustrates an example of storage regions provided in the agent device for storing authentication information and other information for establishing communication with the registry apparatus.

FIG. 5 schematically illustrates an example of information stored in the storage circuitry 16 of the agent device 4. The storage circuitry 16 has a one time programmable (OTP) region 20 for storing a device identifier 22 which uniquely identifies the agent device 4. The device identifier 22 is embedded within the OTP region 20 during the manufacture of the agent device 4. In this embodiment, once fixed in the OTP region 20, the device identifier 22 cannot be changed. For example, after writing the device identifier to the OTP region 20, fuses can be burnt through in the storage circuitry so that the OTP region 20 cannot be rewritten. Alternatively, in some devices it may be possible to generate a new identifier for the device post-manufacture. For example, when transferring the device to a different registry it may be possible to assign a new identifier to the device to avoid conflicting with identifiers of devices already managed by the new registry.

The storage circuitry 16 also comprises a non-volatile memory region 24 which can be both read and written to, but for which read and write protection is applied so that the region 24 can only be accessed by privileged software executed by the processing circuitry 12. The read/write protected region 24 stores a registry address 26 which comprises a URL, IP address or other identifier which enables the agent device 4 to contact the registry 8. The protected region 24 also stores a registry public key 27 for decrypting messages received from the registry 6 to verify that the registry is authorised (the registry public key 27 corresponds to a registry private key held by the registry).

The protected region 24 also stores a sensor key 28 or private key 29 which is a unique key maintained by the agent device 4 for uniquely identifying its identity. The sensor key 28 is a symmetric key which is shared with the registry 8. A message may be at least partially encrypted using the sensor key 28, and if the registry 8 can successfully decrypt the message using the same key then the message is deemed to have been received from the trusted agent device and the device is therefore authenticated. Alternatively, the agent device may be provided with a private key 29 corresponding to a different public key held by the registry 8. Such an asymmetric key pair enables more secure authentication of the agent device since no other device holds the private key 29 of the agent device 4. The public key 32 corresponding to the private key 29 is placed in a write protected, but non-read protected, region 34 of the storage circuitry 16. Hence, the public key 32 can be read by any device or any software running on the agent device 4. Also, a digital certificate 36 associated with the agent device 4 is also stored in the open region 34 of the storage circuitry 16. The digital certificate contains various data identifying the agent device 4 and metadata as well as the public key 32. The certificate is sent to the registry 8 during authentication, and the registry signs the certificate to authenticate the agent device identity. Other devices can then read the certificate from the registry 8 and the registry's signature verifies that the agent device is trusted and that the public key 32 associated with the certificate 36 actually comes from that agent device. Hence, the registry 8 can act as a certifying authority for certifying public keys 32, in a similar way to other certifying authorities in a public key infrastructure (PKI).

The read/write protected region 24 also stores one or more application keys 30, which are symmetric keys for performing trusted communication with application providers 6. These keys are provided by the registry 8 and are used to encrypt/decrypt data or commands exchanged by the agent device 4 and the application provider 6. A different application key can be provided by the registry 8 for each pair of agent device 4 and application provider 6, to maintain security of the communication between the devices. In other embodiments, asymmetric keys could be used as the application keys 30 provided to the device 4 and application provider 6. The application keys provided by the registry apparatus 8 may be generated by the registry apparatus 8 itself, or could be obtained by the registry from another device, such as a hardware key generator or key storage device.

Figure 6:
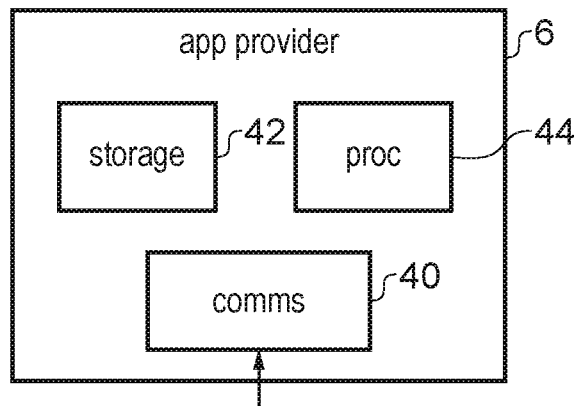
FIG. 6 shows an example of an application providing apparatus.

FIG. 6 shows an example of the application providing apparatus 6. Communication circuitry 40 is provided for communicating with the registry 8 and the agent devices 4. Again, different forms of wired or wireless communication may be provided as discussed above for the agent device 4. The application providing apparatus also comprises storage circuitry 42 storing various data and applications used by the application providing apparatus 6. For example the storage circuitry 42 may store an application program which uses the data received by the communication circuitry 40 from the agent devices 4 and processes it in some way, or which issues control commands to the agent device 4. Processing circuitry 44 is provided for executing the applications and controlling other operations such as authentication with the registry 8, and encryption/decryption of the data exchanged with the agent device 4. Cryptographic features may be provided, such as secure memory in the storage circuitry 42 and crypto algorithms or secure processing functionality in the processing circuitry 44.

Figure 7:
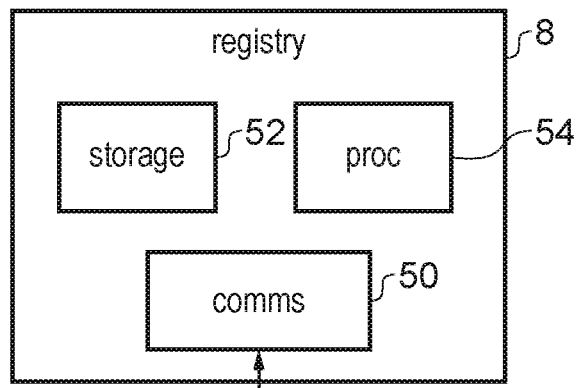
FIG. 7 shows an example of a registry apparatus for maintaining a trusted device register.

FIG. 7 shows an example of the registry apparatus 8 for maintaining the device registry. The registry 8 has communication circuitry 50 for communicating with the agent devices 4 and application providing apparatuses 6. Again, the communication circuitry 50 may use various kinds of wired or wireless communication as discussed above. The registry also has storage circuitry 52 which stores programs executed by the registry 8 and which stores the device registry for tracking information about the various agent devices 4 and corresponding applications 6. Processing circuitry 54 is provided for executing the application programs stored in the storage circuitry 52 and controlling operations such as authenticating the agent devices 4 and application providers 6, carrying out transfers of agent devices 4 between different registries, and managing meta-data about agent devices. Again, cryptographic features may be provided, such as secure memory in the storage circuitry 42 and crypto algorithms or secure processing functionality in the processing circuitry 44. The registry 8 can also respond to queries from external devices for information about certain agent devices 4, such as information about which authentication model is used by the agent device. For security reasons, not all registries 8 may allow such queries. For example, some registry operators may prefer not to give information about the authentication model used by a particular agent device 4. Also, the registry 8 may perform authentication of the querying device before responding with information about the agent devices 4, to ensure that only trusted querying devices are allowed to obtain this information.

Figure 8A:
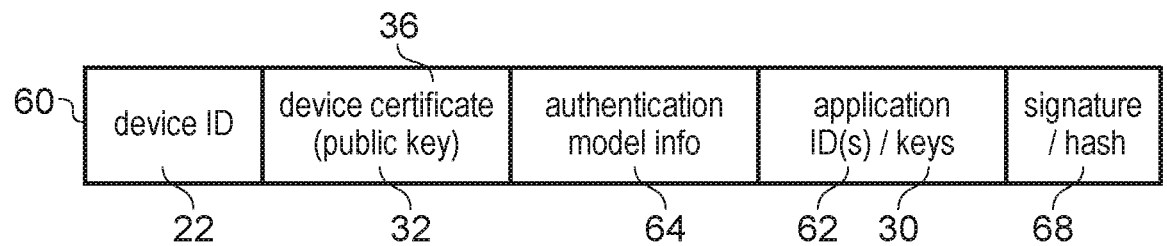
FIG. 8A shows an example of a registry entry for an agent device.

FIG. 8A shows an example of a registry entry 60 stored by the storage circuitry 52 of the registry apparatus 8. Each agent device 4 registered with the registry may have a registry entry comprising the device identifier 22 of the agent device 4 (corresponding to the identifier 22 stored in the OTP region 20 of the agent device 4). The registry entry also comprises the device certificate 36 and public key 32 of the agent device 4, and any other authentication information used by the registry 8 to verify that the agent device 4 is trusted. While FIG. 8A shows an example with the certificate 36 and public key 32 in the same field, these could also be provided in different fields. Also, the registry entry 60 may also have fields for other types of authentication information for use in other authentication models.

The registry entry 60 also includes one or more application identifiers 62 which identify one or more application providing apparatuses 6 with which the agent device 4 is to establish trusted communication, and one or more application keys 30 for communicating with the identified application providing apparatuses 6. Again, the application identifiers 62 and corresponding application keys 30 may be in the same field or separate fields of the registry entry 60. The application identifiers can be stored in the registry entry in response to a request from the application provider that it is associated with that agent device. Hence, the agent device itself does not need to be aware of which application it this communicating with and the registry 8 can provide the link between an agent device and application providing apparatus. For example once the agent device has received the application key 30 from a registry 8 then it can simply output data encrypted using the application key 30 without worrying where that data is going.

The registry entry 60 also comprises authentication model information identifying which authentication model is used by the agent device 4 for securely authenticating itself, as will be described below. It will be appreciated that the registry entry 60 may comprise many other types of information and metadata about the agent device which can be queried by external devices such as application providers. It will also be appreciated that the agent device 4, application providers 6 and registry 8 may comprise many other elements other than those shown in FIGS. 4, 6 and 7.

Also, the registry entry 60 comprises a signature/hash field 68 which includes a trusted signature or hash value generated based on the information in at least some of the other fields of the registry entry 60. This allows for tamper detection in the event that a device or person tries to modify one of the other fields after the registry entry 60 is first created in the registry. The registry apparatus 8 can recalculate the signature or hash using the other fields and check whether it matches the stored signature/hash field 68.

Figure 8B:
FIG. 8B shows an example of an event record for an agent device.

As shown in FIG. 8B, the registry apparatus 8 may also store event entries 69 for corresponding agent devices 4. The event entries 69 may be sub-entries of the registry entry 60 shown in FIG. 8A, or may in other embodiments be provided as separate records that are associated with the registry entry 60 by a device ID 22. The event entries 69 provide historical information about events that have happened to the corresponding agent device 4. A particular agent device 4 may have zero, one or multiple event entries 69 associated with it. Hence, there may be a one-to-many relationship between the registry entry 60 for a particular device and the event entries 69 associated with the same device. The event entry 69 includes fields for the device ID 22 of the agent device, date information representing the date on which the event took place, an event record indicating the type of event which took place and any other information associated with the event, and a signature/hash field for tamper detection, which is similar to the signature/hash field 68 of the registry entry 60. A new event entry 69 can be created on occurrence of an event associated with the agent device 4. For example, events that may recorded include dispatch of the agent device 4 from manufacture, shipping (location), activation or deactivation of the device, registration of the device by a consumer, and many other things. The event entries 69 allow the registry to track the history of a device.

Figure 9:
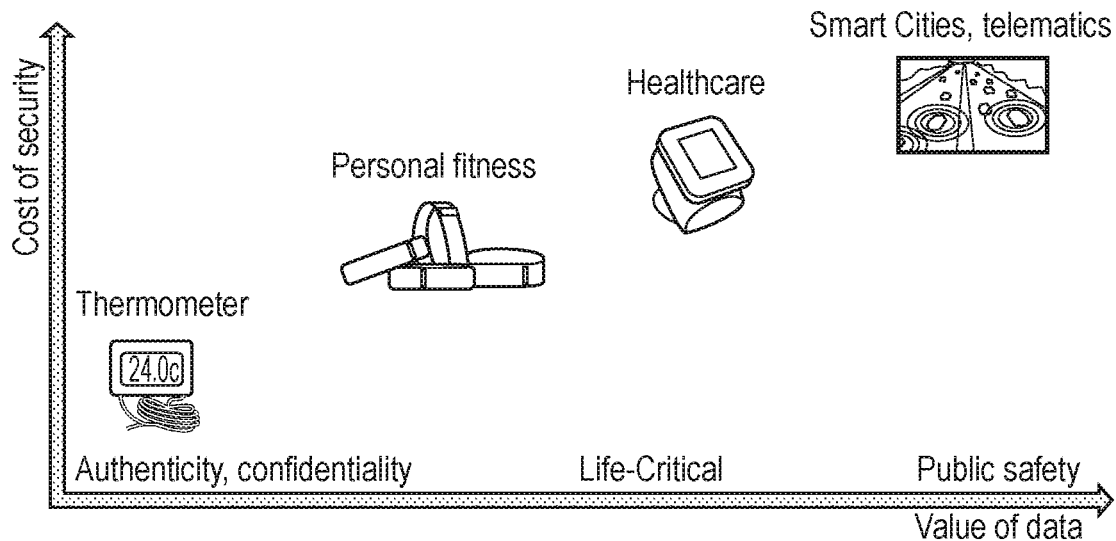
FIG. 9 is a graph illustrating a trade-off between security and the cost of implementing the security.

As shown in FIG. 9, different types of agent device 4 may have different requirements for security and authentication. In general, the higher the level of security required (for example because data is valuable, personal, commercially sensitive or because there are health or public safety issues associated with use of the data), the higher the cost of manufacturing the agent device 4, because more complicated resources for managing the authentication may be required. For some devices, this additional cost may not be justified. For example for an agent device such as a thermometer which feeds data to a weather monitoring application all that may be required is that the data can be trusted to be authentic and so a relatively low cost and low security authentication model may be used. On the other hand, for other kind of devices which are used in health care or in smart cities or telematics, it may be very important that the agent device integrity and authenticity is not compromised. For these applications, it may be justified incurring increased costs to obtain higher degree of security. Hence, as shown in FIG. 9, multiple different trust levels may be established to provide a scalable technique for maintaining authentic device identity for IOT devices. Each agent device 4 may have a particular authentication model selected for it, and the selected model may be indicated in the registry entry 60 using the authentication model information 64 as shown in FIG. 8. There may also be commercial needs for devices with similar functions to have authentication models operating at different levels of security. This may be useful to cater for different fields of use.

Having established different agent devices 4 with different authentication models during the manufacture or the distribution of the devices, the registry 8 may then partition or segregate agent devices into different categories based on authentication model information 64. For example, certain applications 6 may specify that they can only communicate with agent devices having a particular authentication model. Also devices may query the registry 8 to determine the authentication model for a specified agent device 4. For example, a banking application provider may wish to establish that a user's off the shelf agent device 4 meets certain minimum security requirements before establishing trust communication with agent device 4. The different authentication models may differ in many different ways. For example, some authentication models may use fixed, unchangeable, authentication information while other authentication models may allow the authentication information to be updated using key generating circuitry 18 of the agent device 4. For the fixed models, the key generating circuitry 18 may not need to be provided with an agent device 4 so the agent device can be implemented more cheaply, while for agent devices having the key generation capability then more secure authentication can be provided since the keys can be regenerated when required. Similarly, some authentication models may use symmetric keys shared by the agent device 4 and registry 8, while other devices may use asymmetric keys where the agent device 4 and registry 8 have different complementary keys. Some models may permit transferring of an agent device to one registry to another whilst other models may restrict the agent device to operating with a particular registry. Hence there are many different ways of implementing authentication models which can be selected as appropriate during the manufacture or development of an agent device.

Figure 10:
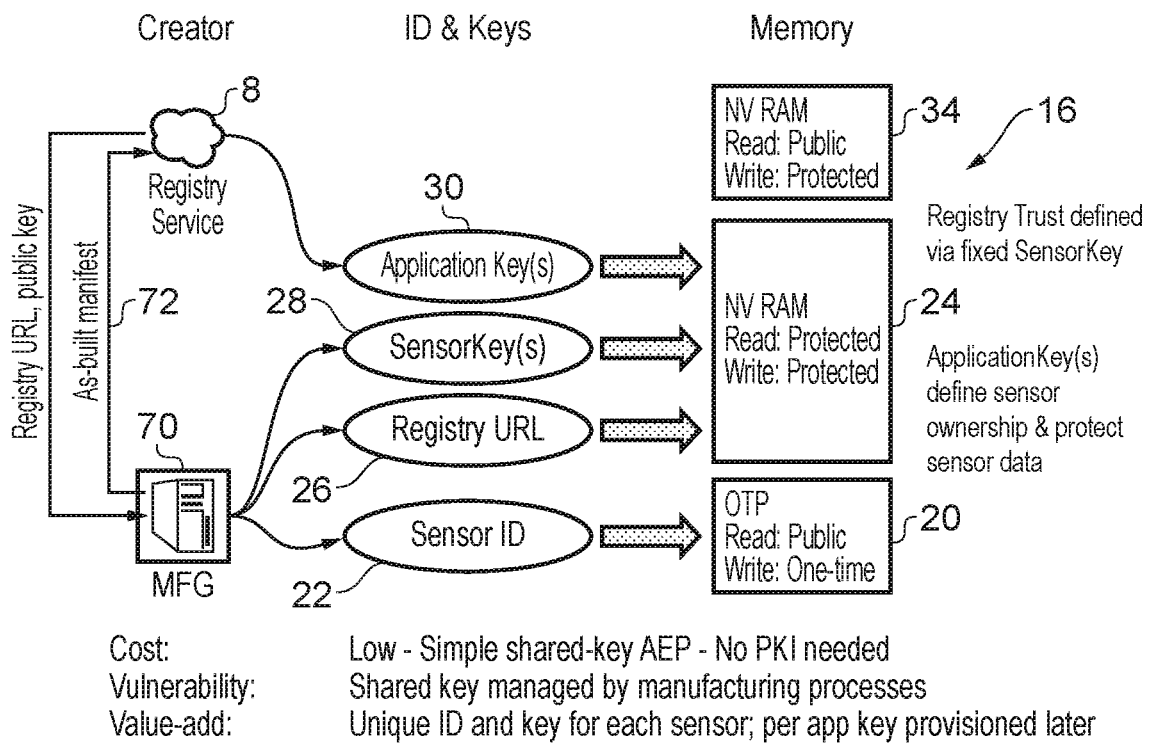
FIGS. 10, 11 and 12 illustrate three examples of authentication models for authenticating the identity of an agent device.
Figure 11:
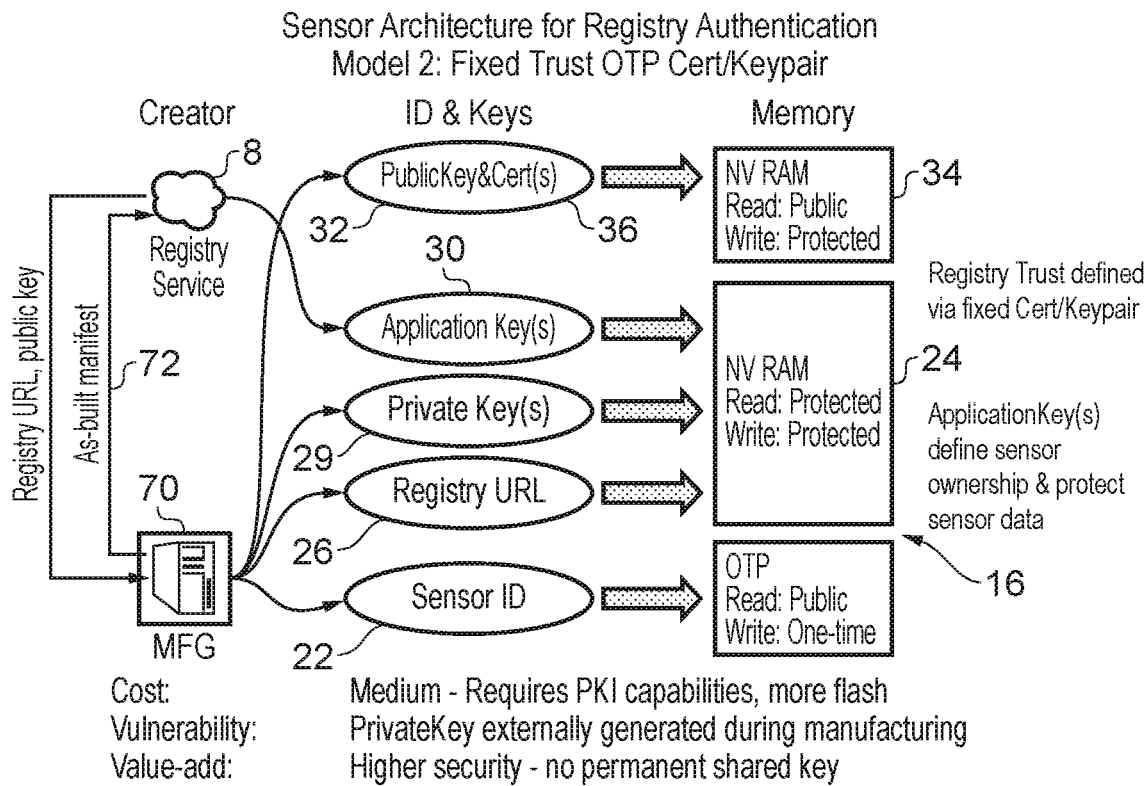
Figure 12:
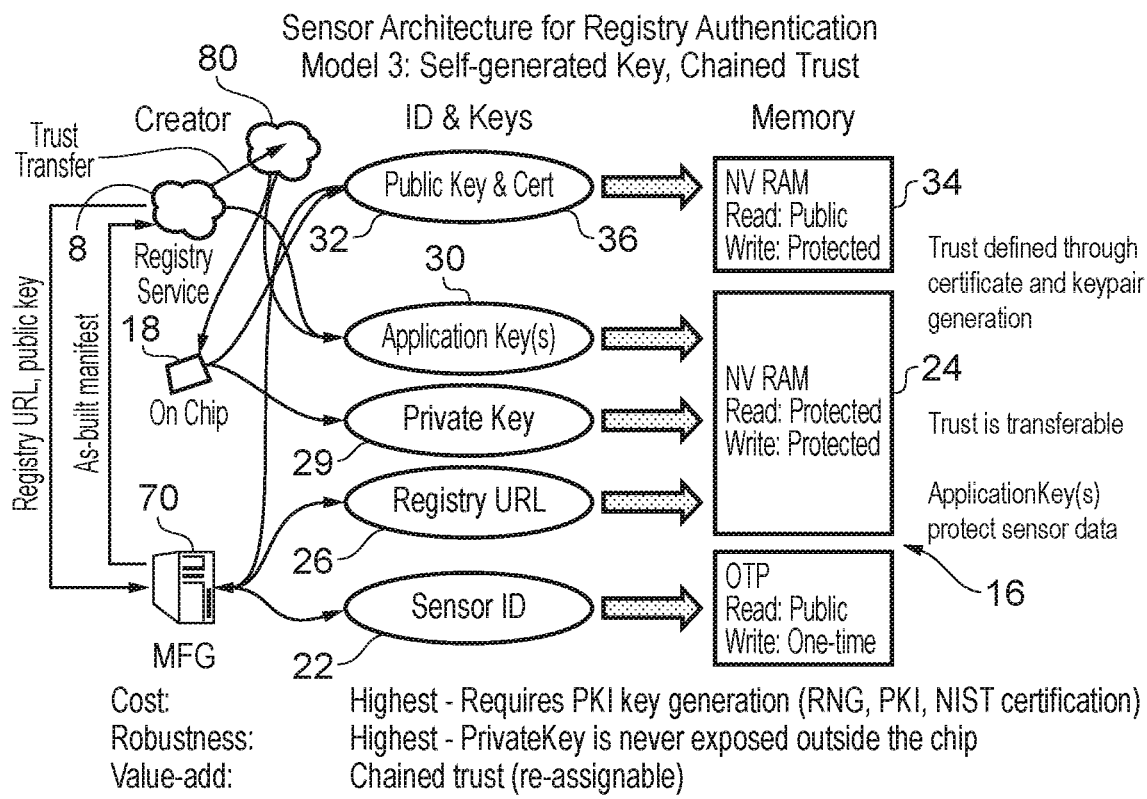

FIGS. 10 to 12 illustrate three examples of authentication models. FIG. 10 shows a first authentication model in which a fixed sensor key 28 is injected into the protected region 24 of the agent device 4 during manufacturing. The sensor key 28 is generated by an external device 70 belonging to the manufacturer. The sensor key 28 is then shared with the registry 8 as a shared secret that uniquely identifies the device. For example, the sensor key can be a 128-bit or 256-bit AES (Advanced Encryption Standard) key generated during manufacturing. To authenticate the agent device 4, the agent device 4 can transmit a message to the registry 8 with part of the message encrypted with the sensor key 28. If the registry 8 can successfully decrypt that part of the message 28 and verify that it is correct using its own copy of the sensor key 28 then the authentication of the agent device 4 is successful. For example, a hash may be generated from the message by the agent device 4 and the sensor key 28 used to encrypt the hash. The registry receiving the message may generate its own hash of the received message using the same algorithm as the agent device 4 and may also decrypt the received hash and check whether it matches the hash it has generated. If the two hashes match, then the agent device is authenticated. The advantage of the first authentication model is that it is low cost to implement. It is not necessary to provide a public key infrastructure or key generator 18 in the agent device 4. Only AES, or another shared secret scheme, is required. However, the low cost comes at the price of reduced security since the shared secret, if compromised, provides an attacker with complete control of the device or agent device including ownership changes or data access. Since the shared sensor key 28 provided to the registry 8 is identical to the sensor key 28 used to authenticate the device, the potential for compromising the sensor key 28 is greater compared to the use of asymmetric keys, especially during the distribution 72 of the sensor key from the manufacturing system 70 to the registry 8. However, as the sensor key 28 is unique for each agent device 4 then even if the sensor key is compromised, this will only affect one agent device 4 and will not affect any other agent devices. Hence, this model can be used for low security applications such as weather forecasting.

In some embodiments, instead of having a single sensor key 28, a list of sensor keys may be embedded into the agent device 4 and a key from the list may be selected by the agent device 4 for authenticating itself In this case, the device's active identification may be defined using an index into the list indicating which key is the selected key. The registry 8 could then be provided with a corresponding agent device key for the selected key. With this approach, then if one sensor key is compromised, the agent device 4 could switch to using another sensor key from the list.

FIG. 11 shows an example of a second authentication model in which the authentication information for the agent device 4 is still fixed (unchangeable) but this time the authentication information comprises an asymmetric key pair comprising a private key 29 and a public key 32. This is more secure because the private key 29 can be held only by the agent device 4 and not shared with any other devices while the corresponding public key 32 can be widely broadcast to other devices without compromising the private key 29. Asymmetric key pairs are such that a message partially encrypted using the private key 29 in a similar way to discussed above can only be decrypted using the corresponding public key 32. Hence, if the registry 8 can successfully decrypt the message received from the agent device using the public key 32, then it can be sure that the message came from the authorised agent device having the private key 29. The key pair is also associated with a digital certificate 36 which represents the public face of the agent device 4. The certificate 36 may be used to transmit the public key 32 to the registry 8 and once signed by the registry verifies that the public key 32 is the correct key for that agent device 4. The key pair and certificate may comprise any sort of form of signed certificate and key pair. For example, elliptic curve cryptography (ECC) keys may be used as the key pair 29, 32 and X.509 certificates may be used as a digital certificate 36. In this model, the manufacturing device 70 generates the key pair and the certificate 36 during manufacturing and embeds them in protected regions 24, 34 of memory as shown in FIG. 11. Although there is a potential vulnerability in that the manufacturing process 70 will know the private key 29 of the agent device 4, the manufacturer 70 can delete the private key 29 once it has been injected into the agent device 4, and after this then the agent device 4 will be the only device having access to the private key. The private key is not required by any part other than the agent device 4 itself. The transfer of authentication information from the manufacturer 70 to the registry 8 is more secure since it only needs to transfer the public key 32 and certificate 36 and not the private key 29. However, in this model the cost is increased compared to the first authentication model since the agent device requires PKI capability and more protected memory for storing the private key 29, public key 32 and certificate 36. However, security is higher as there is no permanent shared key which is known by devices other than the agent device 4. Again, rather than a single key pair the agent device 4 may have a list of key pairs available for selecting once the agent device is operational. Nevertheless, in this case the list does not have significant protection requirements because the list of agent devices keys maintained by the registry 8 consists of public keys and certificates only. Any known PKI scheme may be used for the second model.

FIG. 12 shows a third authentication model which is even more secure then the first and second but costs more to implement. Again, a private key 29 and a public key 32 are provided in the storage circuitry 16 of the agent device 4 together with a digital certificate 36. However, the third model differs from the second model in that on-chip key generating circuitry 18 is provided in the agent device 4 for generating the key pair 29, 32. This provides more security since the manufacturer 70 never knows the private key 29 of the agent device 4. Also, as on-chip key generation facilities are provided, then if necessary then the agent device can regenerate the keypair to change the authentication information. Only the public key 32 and certificate 36 are provided to external devices such as the registry 8. Hence, during identity and ownership establishment, the chip set 18 within the agent device 4 creates an asymmetric key pair such as an ECC key pair. The private key 29 is stored in the read/write protected region 24 of the memory. Only privilege code has access to the private key 29. The on-chip key generating circuitry 18 will also generate the certificate 36 and send a certificate signing request containing the device ID 22 and the public key 32 to the registry 8. The public key 32 and certificate 36 are also written into the write-protected region 34 of memory which is fully readable without protection. The registry 8 signs the certificate 36 to verify that the agent device is authorised. This method does not have the exposure vulnerabilities of models 1 or 2 in which the sensor key 28 or private key 29 could be extracted from the registry 8 or the manufacturing platform 70. The private key 29 of the agent device is never exposed to any devices other than the agent device 4. In this case the strength of the security relies on the quality of the key pair generation by the on chip key generator 18, and for this to be sufficiently secure, there is an added cost in manufacturing the device because additional silicon is necessary in order to support secure key generation (for example, good random number generation will be required).

In the example of FIG. 12, the third authentication model also permits the trusted relationship between the registry 8 and the agent device 4 to be transferred to a second registry 80. This process will be described in more detail later. Since the agent device 4 has on-chip key generating circuitry 18 then this means that when transferring the agent device trust from the first registry 8 to the second registry 80, new keys can be generated so that the first registry 8 no longer can authenticate the agent device 4. This can be useful for providing additional security in that an operator of a private registry 8 such as for use in government or defense applications can require that certain agent devices are transferred to its registry and all ties with a public registry 8 removed. Alternatively, the first registry could be instructed to delete the relevant entry so that it can no longer authenticate the agent device. In this way, the agent device does not need to generate a new key. In another variant, the agent device may have more than one pre-stored keys. On changing registry, a previously unused key may then then used.

It will be appreciated that it may also be possible to provide the ability to transfer trust between registries for the other models of FIGS. 10 and 11. However in this case as the agent device cannot regenerate its key information then the agent device 4 would be registered with the same key information in the second registry 80. In this case, the two registries 8, 80 could share the same agent device 4 so that the same agent device 4 is registered with both registries. Hence, rather than transferring the agent device data directly to the other registry, instead the agent device could be assigned to both registries so that the agent device can communicate with application providers associated with both registries.

Hence, a number of different kinds of authentication model can be provided to allow agent device designs to balance the ability to maintain a sufficient degree of security with the cost of implementing the security. Depending on the intended purpose of the agent device, during manufacturing a particular model can be selected and information regarding which model has been used can then be maintained by the registry 8 to allow applications to use appropriate agent devices for their requirements. FIG. 13 shows a table comparing different properties of the models shown in FIGS. 10 to 12. It will be appreciated that other types of models may be used. For example, different types of key generation may be used to provide different degrees of security.

Figure 14:
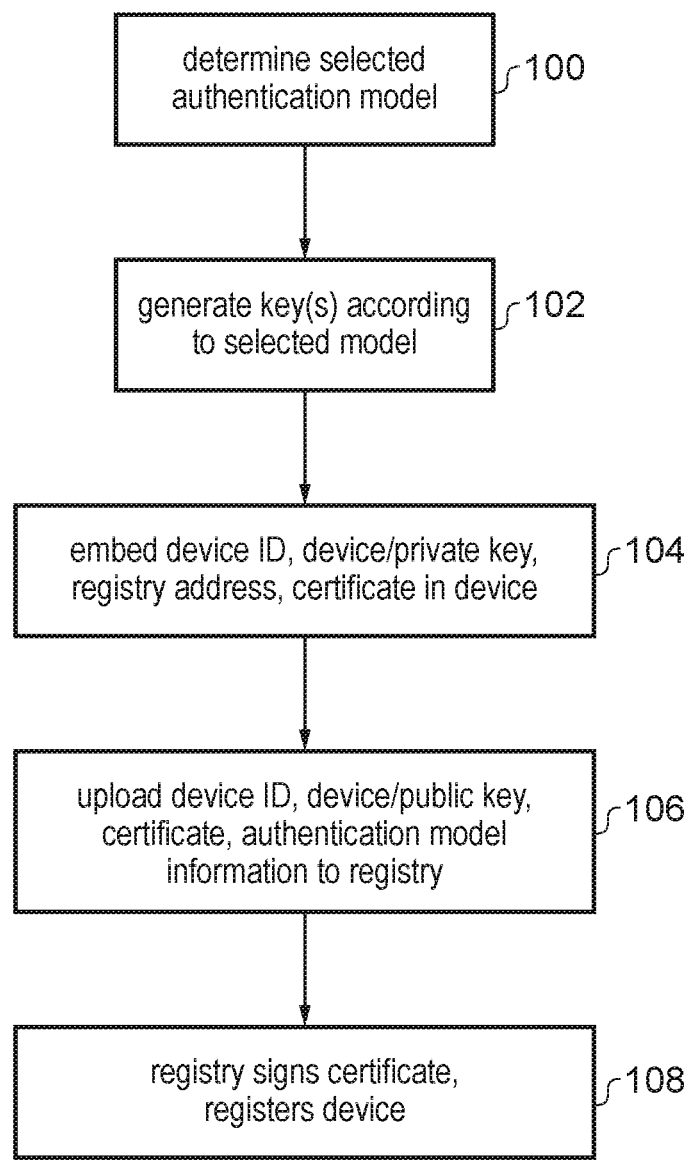
FIG. 14 shows a first example method of establishing a trusted identity for an agent device.

FIG. 14 shows a first example of a method of establishing a trusted identity of an agent device 4. The trusted identity may be established during the manufacturing of the agent device, during its distribution, or later when enrolling the device with the registry. At step 100 the authentication model to be used for the agent device 4 is determined. If the agent device 4 has already been manufactured then the determination of the selected authentication model will depend on which resources have already been provided in the agent device 4 (for example if the agent device does not have on-chip key generating circuitry 18 then authentication model 3 discussed above may not be able to be selected). On the other hand, if the method is performed before or during the agent device manufacture then any authentication model may be selected and then the required processing resources for implementing the model can be implemented later (such as building protected storage, PKI infrastructure, or key generation capability into the device).

At step 102 the key information for authenticating the agent device 4 is generated according to the selected authentication model. This may be performed either by the external manufacturing device 70 or by the agent device 4 itself, depending on the selected model. At step 104, the device ID 22, the shared sensor key 28 or private key 29, the registry address 26 and optionally the device certificate 36 are embedded within the storage circuitry 16 of the agent device 4. The embedding step may be implemented either by building storage circuitry into the device, or by storing the information in storage circuitry already provided within the agent device during a previous stage of manufacture. If authentication model 1 is used then the sensor key 28 is embedded, while if authentication models 2 or 3 are used then the private key 29 and certificate 36 are stored in the storage circuitry 16. At this point, the agent device 4 may also be provided with registry authentication information for verifying the identity of the registry 8.

At step 106, various metadata for defining the trusted identity of the agent device are uploaded to the registry apparatus 8. For example, the device ID 22, the sensor key 28 (for model 1) or public key 32 (for models 2 or 3), the digital certificate 36 (for models 2 or 3) and the authentication model information 64 indicating the selected model may be uploaded to the registry 8. At step 108 the registry signs the certificate if necessary, and registers the device metadata in the registry to establish the device as a trusted device whose identity can be authenticated.

Figure 15:
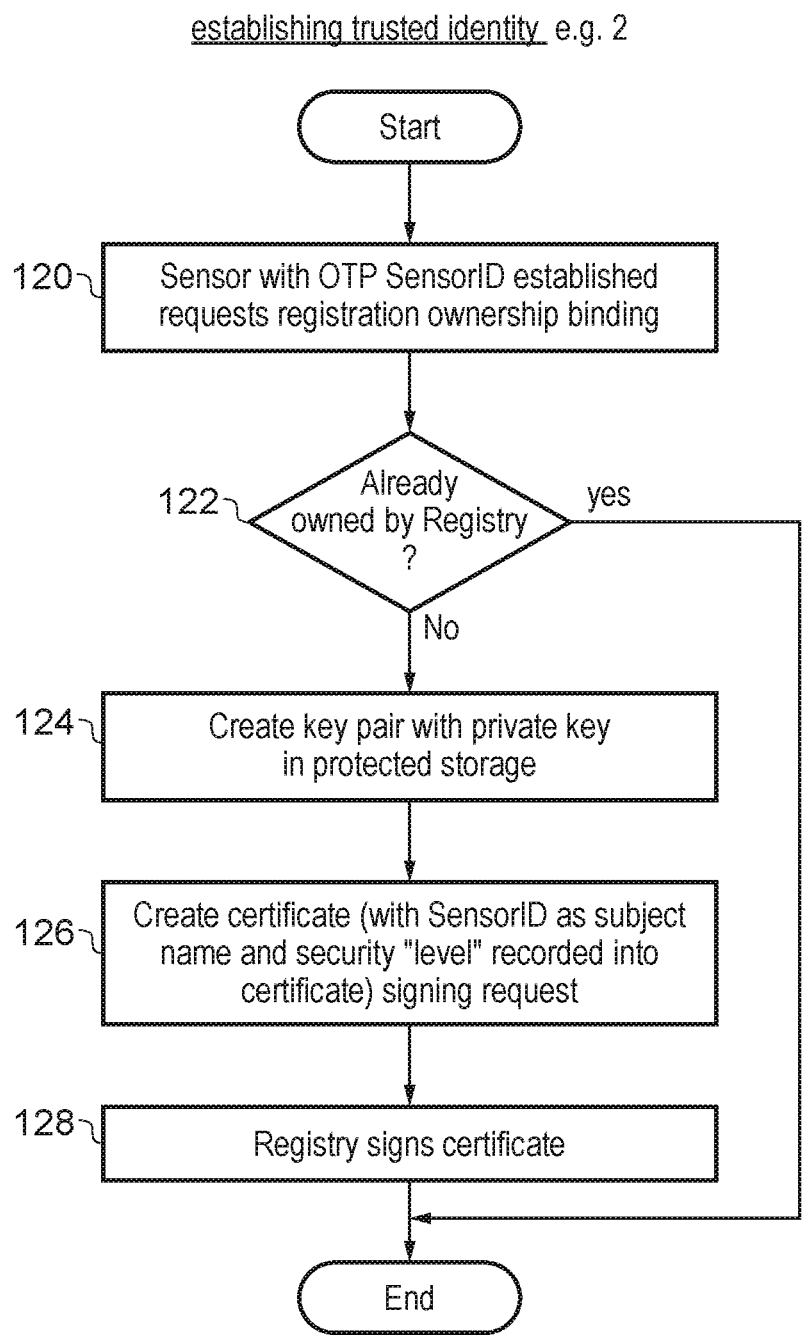
FIG. 15 shows a second example method of establishing a trusted identity for an agent device.

FIG. 15 shows a second example of establishing trust and identity for device. In this example, the agent device (sensor) 4 has already been manufactured with key generation circuitry 18 and with the device identifier 22 stored in the OTP region 20 of the storage circuitry 16. Hence, authentication model 3 or a similar model allowing on-chip key generation is used by this sensor 4. At step 120, the sensor 4 sends to the registry 8 a registration (enrolment) request specifying the device identifier 22 of the sensor 4. At step 122 the registry checks whether the sensor 4 is already owned by the registry, and if so then the method ends.

If the agent device is not already owned then at step 124 the sensor 4 is triggered to create a new key pair 29, 32 using the key generator 18, and the private key 29 of the key pair is placed in the protected storage region 24. At step 126, a certificate signing request is generated, which is sent to the registry 8. The certificate signing request requests that the registry 8 signs the digital certificate 32 of the sensor 4. The certificate includes at least the device identifier 22 of the sensor 4 as a subject name, the security level (authentication model information) of the sensor 4, and the public key 32 generated by the key generator 18. At step 128, the registry 8 signs the certificate to confirm that the certificate and public key are valid. The registry registers the information about the sensor 4 in the device registry to establish the sensor 4 as a trusted agent device.

Figure 16:
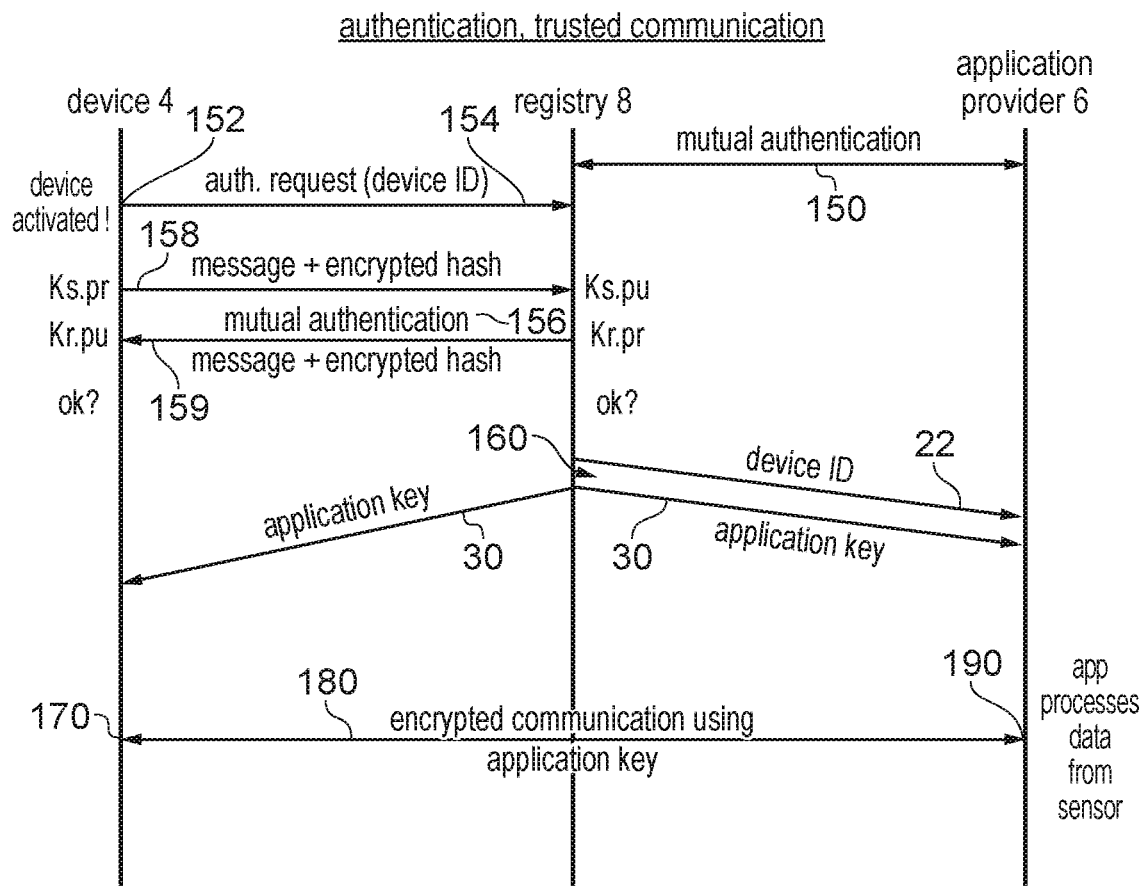
FIG. 16 shows a method of performing authentication between an agent device and the registry apparatus and establishing encrypted communication between the agent device and the application providing apparatus.

FIG. 16 shows a method of performing authentication of an agent device 4 to check that it is registered as a trusted device, and then establishing trusted communication between the agent device 4 and the application providing apparatus 6. It is assumed that the agent device 4 is already registered with the registry 8 using for example the method shown in FIG. 14 or 15, and so the registry 8 comprises information for verifying that the agent device 4 comprises authentication information uniquely identifying the agent device 4. In this example the authentication model 3 is used so that the agent device 4 comprises a sensor private key Ks.pr and the registry 8 comprises a sensor public key Ks.pu corresponding to the private key Ks.pr. Similarly the agent device 4 can authenticate the registry 8 using a registry public key Kr.pu which corresponds to a registry private key Kr.pr held by the registry 8.

At step 150 the registry 8 and the application provider 6 perform mutual authentication of each other to establish trust. Typically, this would be performed once for each application provider 6 by the registry 8. The mutual authentication 150 between the registry 8 and application provider 6 would not typically be repeated for each agent device 4 that is to communicate with the application provider 6. The mutual authentication 150 may take place using any known authentication technique.

At step 152 the agent device is activated, and in response to activation, the agent device 4 transmits an authentication request 154 to the registry identified by the registry URL 26 embedded in the agent device's protected storage 24. The authentication request includes the device ID 22 identifying the agent device 4. Activation of the agent device may comprise for example the agent device being powered up for the first time after being installed, or an activation button on the agent device being pressed. The authentication request 154 may be transmitted automatically in response to activation of the agent device so that there is no need for a user interface or some other kind of user interface to be required for triggering authentication. This means that the person installing or using the agent device need not be aware that the agent device is being authenticated. In response to the authentication request 154, the agent device 4 and registry 8 commence mutual authentication 156 using the keys which have already been exchanged by the agent device 4 and registry 8 during registration or enrolment. In the mutual authentication, the agent device 4 encrypts a hash of a message using the sensor private key Ks.pr transmits the partially encrypted message 158 to the registry 8. In a corresponding way the registry 8 encrypts a hash of a message using the registry private key Kr.pr and transmits the partially encrypted message 159 to the agent device 4. The agent device 4 obtains its own hash of the message 159 and compares this with the hash obtained by decrypting the encrypted hash with the registry public key Kr.pu. If the two hashes match then the registry 8 is assumed to be authentic. Similarly, the registry 8 obtains a hash from the message 158 and compares it with the hash obtained by decrypting the encrypted hash received with the message 158 using the sensor public key Ks.pu. Again if the two hashes match then the agent device 4 is authenticated.

While FIG. 16 shows a separate authentication request 154 and authentication message 158 transmitted by the agent device 4, in other embodiments, the authentication request 154 and the authentication message 158 may be the same message, so that the agent device 4 upon activation 152 transmits the partially encrypted authentication message 158 to the registry 8 (together with the device ID 22) and this acts as the authentication request triggering the registry 8 to respond with the mutual authentication 156.

If the registry 8 successfully authenticates the message 158 received from the agent device 4, then at step 160 the registry 8 generates an application key 30 and sends the application key to the agent device 4. Also, the registry 8 sends the application key 30 to the application provider 6 that is identified by the application identifier 62 in the registry entry 60 for the agent device 4 having the device ID 22 specified in the authentication request 154. The registry 8 also transmits the agent device ID of the agent device 4 to the application provider 6 so that the application provider 6 knows which agent device 4 will be communicating using the received application key 30.

If the agent device 4 has successfully authenticated the registry 8, then at step 170 the agent device 4 and application provider 6 commence encrypted communication using the application key 30 received from the registry 8. If the registry 8 has not successfully been authenticated by the agent device 4 then the agent device 4 does not take part in any encrypted communication using the application key 30. In the encrypted communication 180, in general the agent device 4 would transmit the data to the application provider 6 and the application provider would transmit commands to the agent device 4, although it may also be possible to send data or commands in the opposite direction. At step 190 the application running on the application providing apparatus 6 processes the data received from the agent device. For example the application may use the data to determine further information or may use the data for a cloud computing platform which can be accessed via the Internet. The encrypted communication 180 proceeds directly between the agent device 4 and application provider 6, without going via the registry 8.

Hence, the registry 8 allows the agent device 4 and application provider 6 to encrypt communication without requiring complicated configuration or user interaction at the agent device 4. This means that the agent device 4 can be very simple and need not have complicated processing resources, while security can still be maintained.

Figure 17:
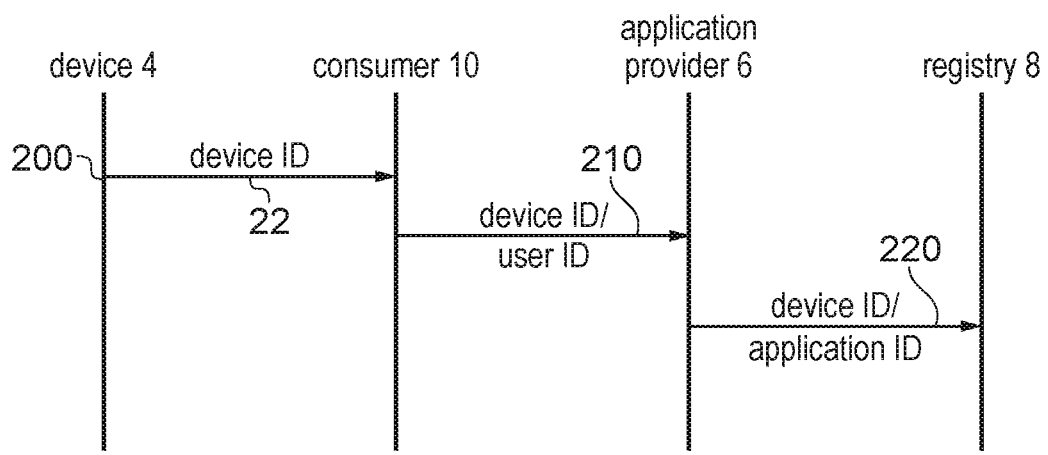
FIG. 17 shows an example of a method of associating an agent device with a user and associating an agent device with a particular application.

FIG. 17 shows a method for associating the agent device 4 with a particular consumer (user) 10 and associating an agent device 4 with an application provider 6 within the registry 8. At step 200 a consumer 10 obtains the device ID 22 of the agent device. This may be done in various ways. For example the agent device 4 or a box for the device 4 may have the device ID printed on it and the consumer could read the device ID from the agent device casing. Also, the device ID may be represented by a barcode or QR code or similar graphic representation and the user may use a code reader to scan the code to obtain the device ID 22. The consumer 10 then transmits a device association request 210 to the application provider 6 containing the consumer's identifier (user ID) and the device identifier 22. This step could happen automatically in response to reading the barcode or QR code using a smartphone or tablet app or a web interface for example. The application provider 6 can now log the user ID against the device ID so that later communication from the agent device 4 can be associated with a particular consumer. Having received the device association request 210, the application provider 6 may also send an application association request 220 to the registry 8 linking the application identifier of the application provider 6 to the device ID 22 from the agent device association request 210. In response to the application association request, the registry 8 registers the application identifier in the registry entry 60 for the agent device having the device identifier 22 specified by the application association request 220.

In other examples, the consumer 10 may have obtained the agent device 4 directly from the application provider and so at the point when the consumer acquires the agent device, the application provider 6 may already know the link between the device ID and user ID. In this case, then there may be no need for a device association request 210 and the application provider 6 may instead use its internal records to generate the application association request 220 to be sent to the registry 8. Note that the registry 8 does not receive the user identifier. The registry entry 60 identifies agent devices 4 solely by device ID and does not contain any user data.

In a similar way, an application association request 220 may also be used by an application provider 6 to request that an agent device 4 which is currently associated with one application provider 6 is transferred to a different provider 6. The application association request 220 may in this case come from various sources, including the agent device itself (for example if the user chooses to switch application providers), the old application provider 6 which was previously associated with the agent device 4, the new application provider 6 to which the device is being assigned using the application association request 220, or another third party device. The registry 4 may check whether the device making the application association request 220 is a trusted device before reassigning the agent device 4 to the new application provider 6. Alternatively, if the agent device 4 is allowed to be associated with multiple application providers 6, then the new application provider 6 may be registered for the agent device 4 alongside the previous application provider 6, rather than replacing the previous application provider 6 as in the example given above.

Figure 18:
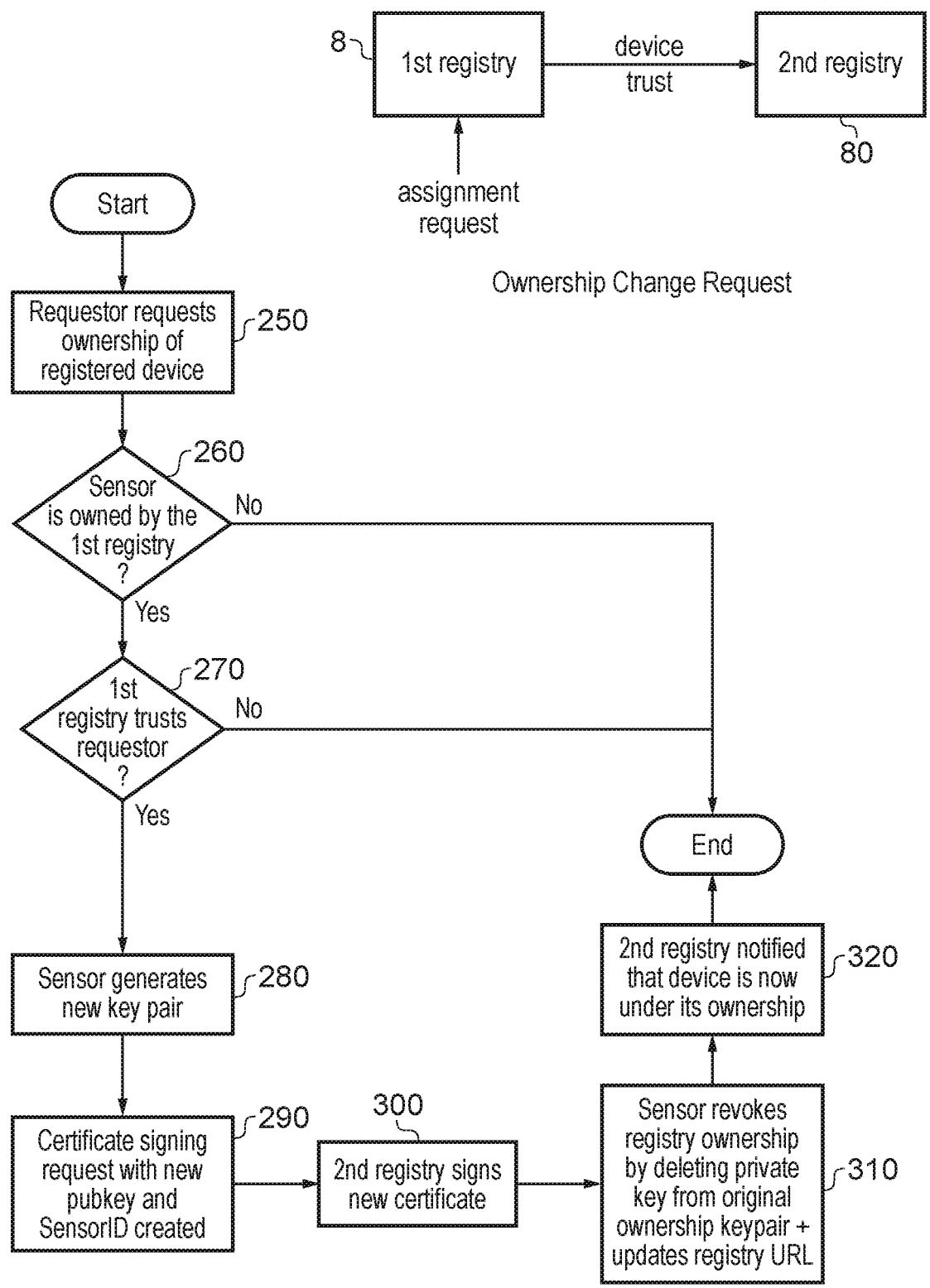
FIG. 18 shows an example of a method of assigning an agent device, which is currently registered with a first registry, to a second registry.

FIG. 18 illustrates a method of assigning an agent device 4 that is registered with a first registry 8 to a second registry 80. At step 250, a requestor device requests that ownership of the registered agent device 4 is transferred to the second registry 80. The requestor device may be the agent device 4, the second registry 80 or could be another third party device such as an application provider (cloud service owner). At step 260, the first registry 8 checks whether the agent device 4 mentioned in the device assignment request is currently registered in the registry. If not, then the method ends. Hence, to be assigned ownership of an agent device, it is necessary to request permission from the first registry 8 which currently has registration of that agent device. This ensures that only registries which have already established trust with the agent device can authorise transferring its trusted status to another registry 80.

At step 270 the first registry determines whether it trusts the requestor device which made the agent device assignment request. If not, then the method ends. The first registry may already have previously authenticated the requestor, in which case it may be determined as a trusted requestor. Alternatively, at step 270 the registry may newly authenticate the requestor if the requester has not already been authenticated. The authentication between the first registry 8 and requestor may proceed using any known technique. Also, for some authentication models, assignment of the agent device 4 to a different registry may not be allowed and so the registry can check whether the authentication model information for the agent device is such that assignment of the agent device if permitted.

Following the checks at step 270, if the registry trusts the requestor and the agent device is allowed to be transferred to a different registry, then the method proceeds to step 280 where the agent device 4 generates a new key pair using the key generator 18. The agent device 4 may be triggered to generate the new key pair in different ways. In one example the first registry 8 may instruct the agent device 4 that it is to be assigned to another registry, and in response to this instruction the agent device may generate a new key pair. Alternatively, the first registry 8 may inform the requestor device or the second registry 80 that the device can be assigned, and this device may then trigger the agent device to generate the new key pair. At step 290, the agent device 4 generates a certificate signing request containing the newly generated public key and the device ID of the agent device 4. The private key corresponding to the public key is stored in secure storage. The certificate signing request is sent to the second registry 80, which at step 300 signs the certificate and registers the agent device 4 in its device register. At step 310, the agent device revokes its original registry ownership by deleting the private key 29 from the original key pair and updating its registry URL 26 to correspond to the URL of the second registry 80. At step 320, the first registry 8 checks that the agent device has correctly transferred its registry ownership and then notifies the second registry 80 that the agent device 4 is now under its ownership. At this point, the first registry 8 can optionally delete the registry entry 60 for the agent device 4 so that it is no longer registered in the first registry. Alternatively, the entry for the agent device could remain in the registry since the public key 32 from the original key pair is no longer relevant as its corresponding private key has been deleted by the agent device 4.

The example shown in FIG. 18 is for authentication model 3 or a similar authentication model where the agent device has the capability to generate new key pairs. In cases where the agent device has authentication model 2 or a similar model where the authentication information is fixed, then rather than generating a new key pair, at step 280, 290 and 300 the original key pair and certificates from the first registry may be used so that the second registry 80 is provided with the same authentication information that was originally registered in the first registry 8. After the assignment, the agent device 4 may be registered in both registries 8, 80 so that can be authenticated by both registers and can communicate with application providing apparatuses associated with both registries 8, 80.

The agent device 4 or the first registry 8 may take steps to ensure that steps 280 to 320 occur atomically so that is not possible for the steps to be interrupted partway through and left incomplete. This means that in the event of a failure partway through the update process, then the only possible outcomes are that either the agent device 4 retains its original key pair and certificate and is not transferred to the second registry (similar to the case when following step 270 the registry determines that the requestor is not trusted), or the agent device will be fully updated to be under the ownership of the second registry. This ensures that the agent device 4 will always be able to contact one registry 8 or 80 and cannot end up not being able to be authenticated by either registry 8, 80.

In some cases, when assigning the agent device 4 to a new registry as shown in FIG. 18, the application provider 6 associated with the agent device 4 may also change. The second registry 80 may for example select which application(s) should be assigned to the agent device 4, or alternatively the second registry 80 may wait for an application association request 220 from an external source, which indicates the application identifier of the application provider 6 to be associated with the agent device 4. Alternatively, on switching registries, the application associated with the agent device 4 may remain the same and the second registry 80 may simply register the same application identifier(s) that was registered for the agent device 4 in the first registry 8 (for example, the first registry 8 may provide the application identifier(s) to the second registry 80).

Figure 19:
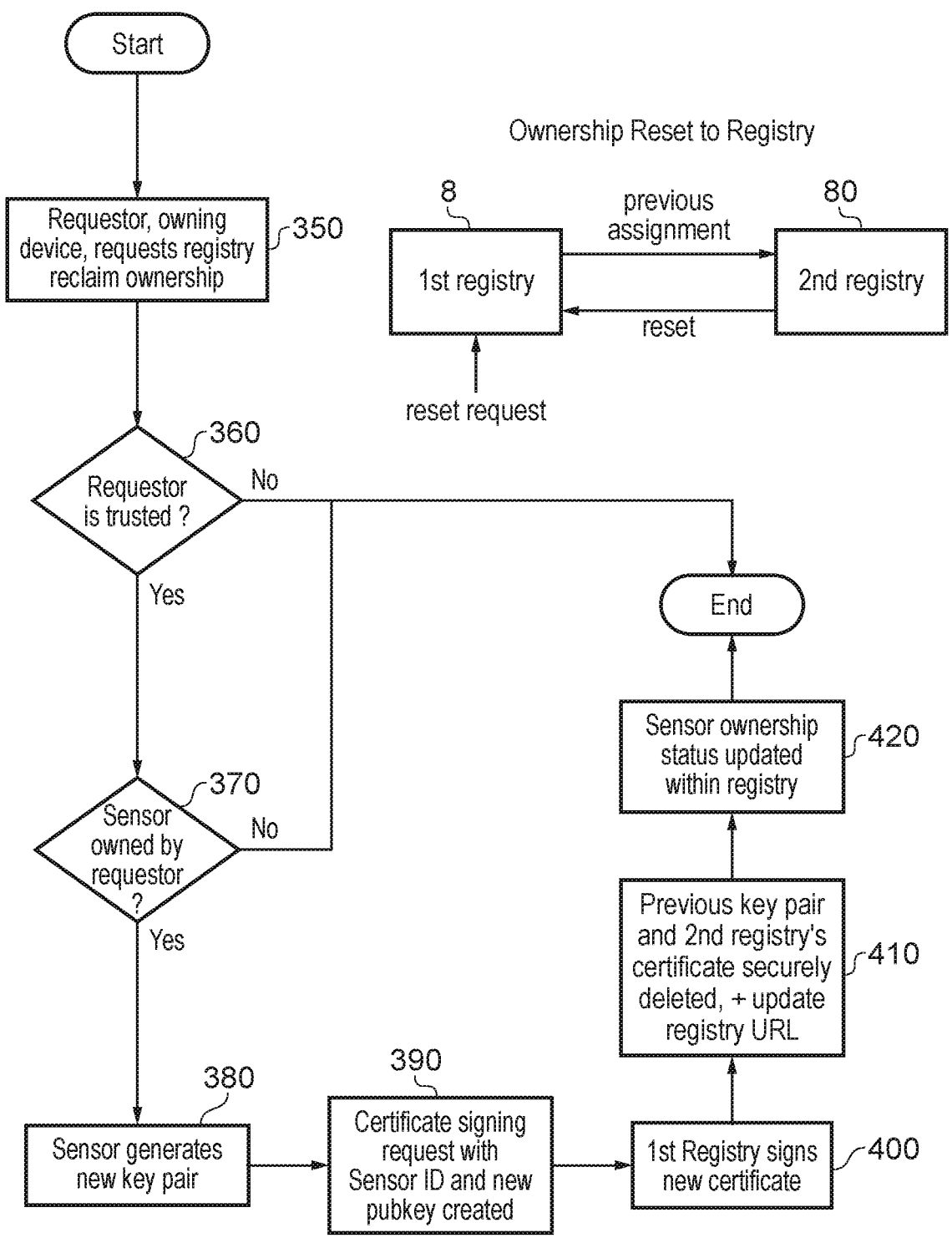
FIG. 19 shows an example of a method of resetting ownership of the agent device back to the first registry.

FIG. 19 shows a method for resetting ownership of an agent device 4 which has previously been transferred to a second registry 80, so that it is returned to the care of the first registry 8 which originally registered the agent device 4. At step 350 the second registry 80 (requestor device) requests that the first registry 8 reclaims ownership of the agent device 4. At step 360 the first registry 8 determines whether the second registry 80 is trusted. Again, this may comprise performing authentication, checking that the requestor has previously been authenticated, or determining whether the agent device 4 supports being reset to the first registry 8. If the agent device 4 is not allowed to be reset to the registry then the method ends. Otherwise, the method proceeds to step 370 where the registry checks that the agent device 4 is currently owned by the second registry 80. If not, then the method ends. This ensures that only the current owner of the registration can trigger registration of the device 4 to be reset to the first registry 8.

If the agent device is owned by the second registry 80, then at step 380 a new key pair is generated by the agent device 4. At step 390 a certificate signing request is prepared with the new public key and the device ID and this is transmitted to the first registry 8. The private key of the generator key pair is stored in the secure storage 16 of the agent device 4. At step 400 the first registry 8 signs the new certificate to authorise the agent device once more. At step 410 the agent device revokes its registration with the second registry 80 by deleting the previous key pair and certificate and updating its registry URL 26 to correspond to the first registry 8. At step 420, the device ownership status is updated within the first registry 8 and the second registry 80 may delete its entry for the agent device 4. The method then ends. Again, the operations at steps 380-420 may be performed atomically to ensure that the agent device is always registered with one of the registries and cannot end up without a valid registration in either registry.

The methods of FIGS. 18 and 19 allow agent devices to be transferred between registries, or assigned to multiple registries at a time, which can be useful to allow certain operators to provide their own private registry of agent devices so as to segregate their agent devices from other agent devices authenticated using a public registry. For example, a defense organisation, government or city management may operate their own registry of secure trusted agent devices for use within their organisation. A general public registry may be provided for general purpose use. When agent devices are manufactured then they may be originally registered with the public registry, but then when an ownership change is requested by a private registry then they can be transferred to the private registry. When the agent devices are no longer required by the private registry then the ownership can be reset to the original registry. Preferably, new authentication information can be generated on transferring to a different registry to ensure that the agent device can no longer be authenticated by the old registry.

Figure 20:
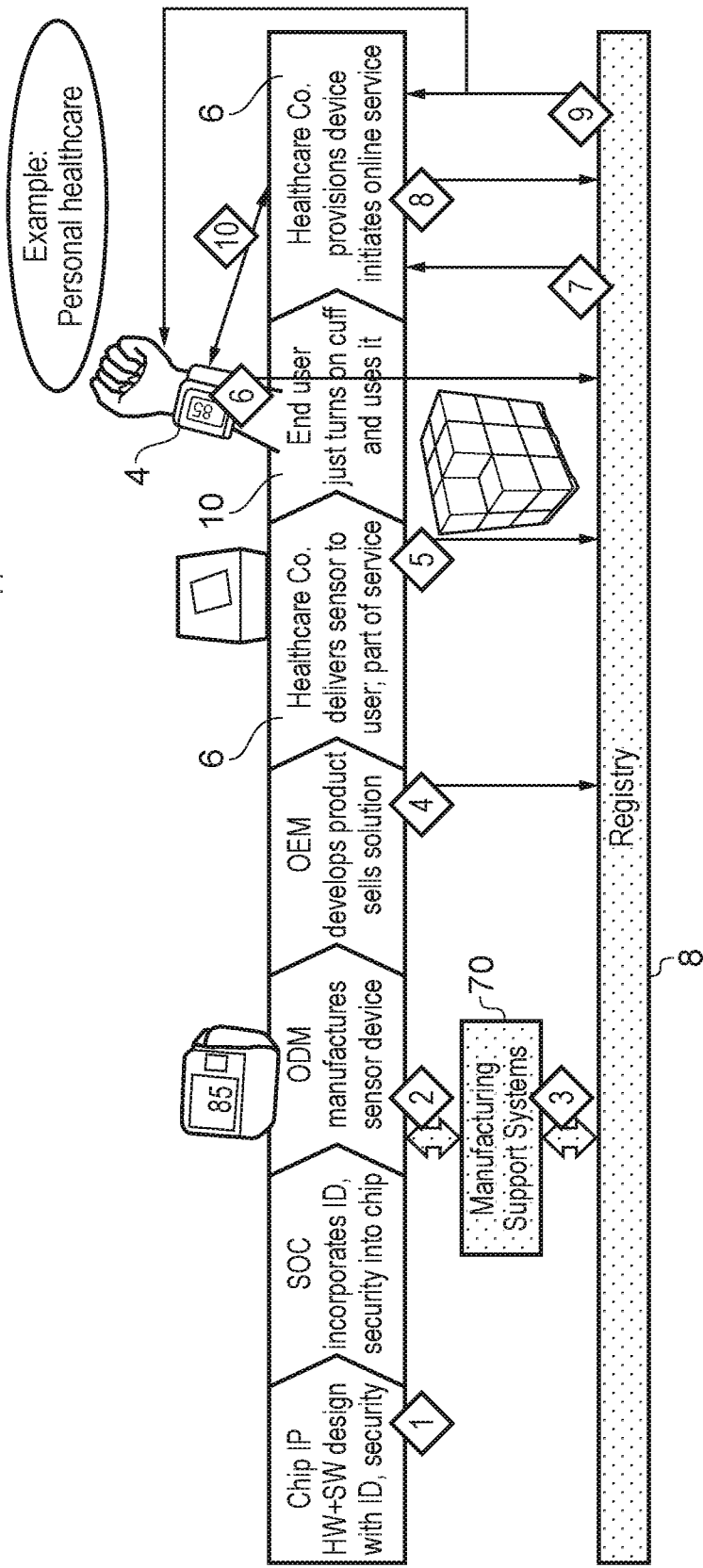
FIGS. 20 to 23 show four examples of use cases for the agent device, the registry apparatus and the application providing apparatus.

FIGS. 20 to 23 show four examples of timelines explaining different examples of applications for the present techniques. FIG. 20 shows a first example in the field of personal healthcare in which the agent device (sensor) is tethered to a particular cloud application so that it is provided directly by the application provider and cannot be used with other applications. The agent device 4 may for example be a wrist-worn sensor containing a heart rate monitor which can feed back heart rate information to an application providing apparatus 6 operated by the healthcare provider for monitoring the patient's health. At step 1, a chip IP company designs the hardware and software for the sensor 4 and the security design guidelines for the sensor. A system on chip (SOC) manufacturer produces the SOC incorporating the security hardware and the unique device identifier. An original device manufacturer (ODM) manufactures the sensor device. An original equipment manufacturer (OEM) develops the final product. At some point during the manufacture process (which could be at the SOC, ODM or OEM stage), at step 2 the device identifier and private key are installed in the agent device 4. At step 3 sensor metadata is uploaded to the registry 8 by manufacturing support systems 70. The metadata may include the device identifier, public key and authentication model information, for example. The registry apparatus 8 registers this information in its device registry.

At step 4, the sensor is sold to the healthcare provider 6. At step 5, the healthcare provider 6 provides the sensor to the user as part of its service. The health care provider 6 associates the sensor ID of the device with the user's ID. Either at step 4 or at step 5, the OEM or the application provider 6 provides an application association request to the registry 8 to inform it that the sensor 4 is to be used with the healthcare provider's cloud application. Hence, while the registry does not have customer information, it knows that when the agent device 4 is activated it will be communicating with the application providing apparatus 6 corresponding to the healthcare company.

At step 6, the user receives the sensor 4 from the healthcare provider 6. The user fits the cuff to his/her wrist, turns on the sensor 4 and starts using it. Turning on the device triggers the sensor 4 to contact the registry 8 with the authentication request, and mutual authentication then takes place as discussed above. The user is not aware of this and there is no user interface for triggering this authentication— the authentication is triggered automatically by activation of the device. The registry 8 determines that the sensor 4 has already been registered in its registry and has an application identifier corresponding to the healthcare provider 6 in its registry entry. Hence, at step 7 the registry 8 notifies the healthcare provider of the device ID and informs the healthcare provider 6 that the agent device is now active with a valid device ID that has been authenticated. At step 8 the healthcare provider 6 requests the application key for secure communication with the sensor 4. At step 9 the registry provides the application key to both the sensor 4 and the healthcare provider 6. At step 10, direct secure encrypted communication begins between the sensor 4 and the healthcare provider 6 without involving the registry.

Figure 21:
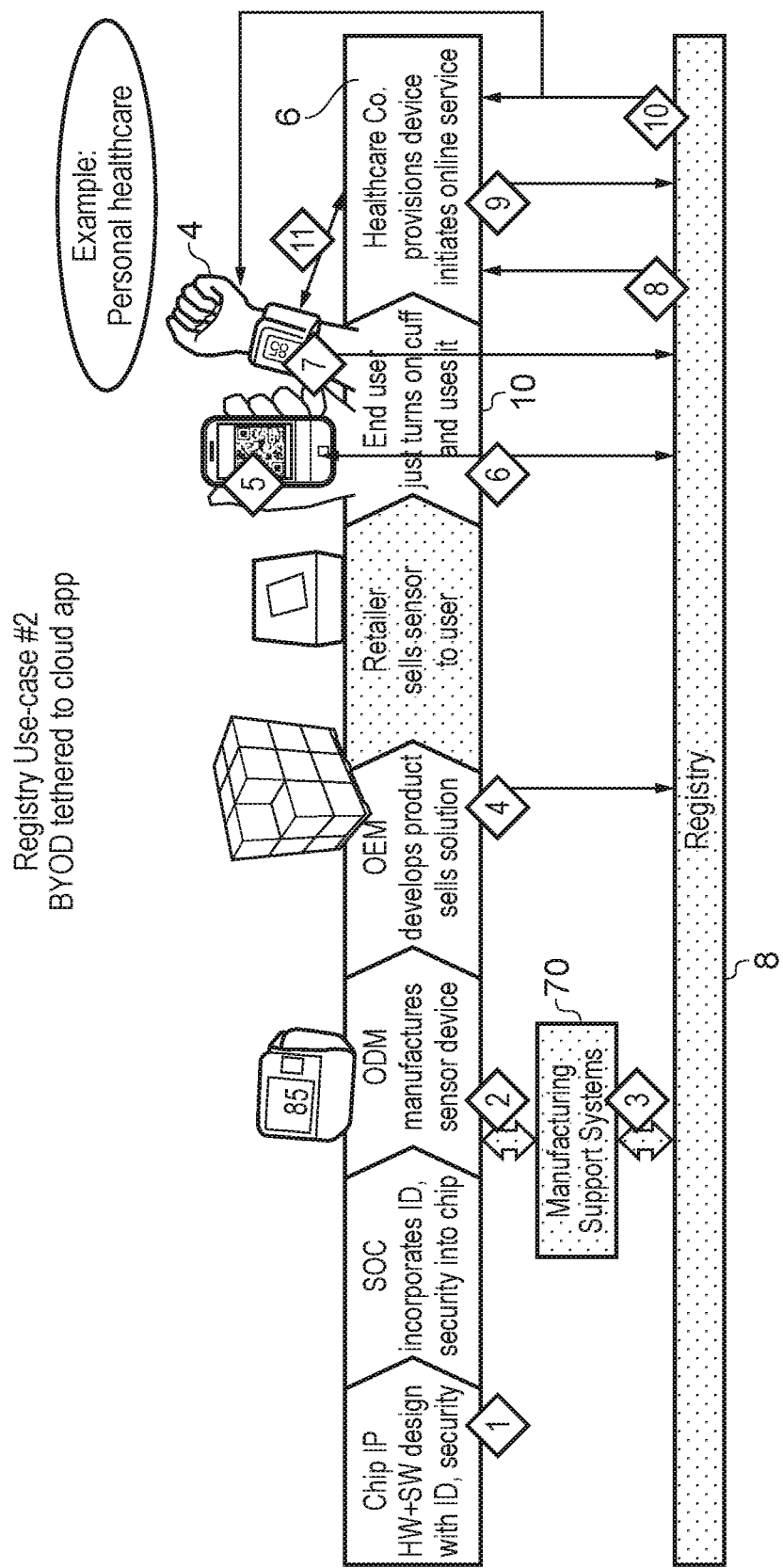

FIG. 21 shows another example of a use case where, instead of the agent device being tethered to the cloud application before it is provided to the user, the user can instead buy an "off the shelf" device and associate the device with a particular cloud application later on. This allows the user to use different types or brands of sensors with the same cloud application. Again the example is in personal healthcare with the application providing apparatus belonging to a healthcare company. Steps 1-3 are the same as in FIG. 20. However, in this case at step 4 the OEM sells the product to a retailer who then sells the sensor 4 to the end user. At this point, the sensor 4 is not bound to the application provider 6.

At step 5 the user runs a smart phone app which is provided by the healthcare provider 6 and scans a code on the sensor 4 itself or the box in which the sensor was packaged. The app on the smartphone transmits a sensor association request to the healthcare provider linking the sensor's device ID to a particular user account. At step 6, the smart phone app or the healthcare provider's platform 6 sends an application association request to the registry 8 linking the application ID to the device ID. Hence now the registry can associate the agent device with a particular application and the application provider can associate the agent device ID with a particular user. Steps 7-11 of FIG. 21 then proceed in the same way as steps 6-10 of FIG. 20 respectively.

Figure 22:
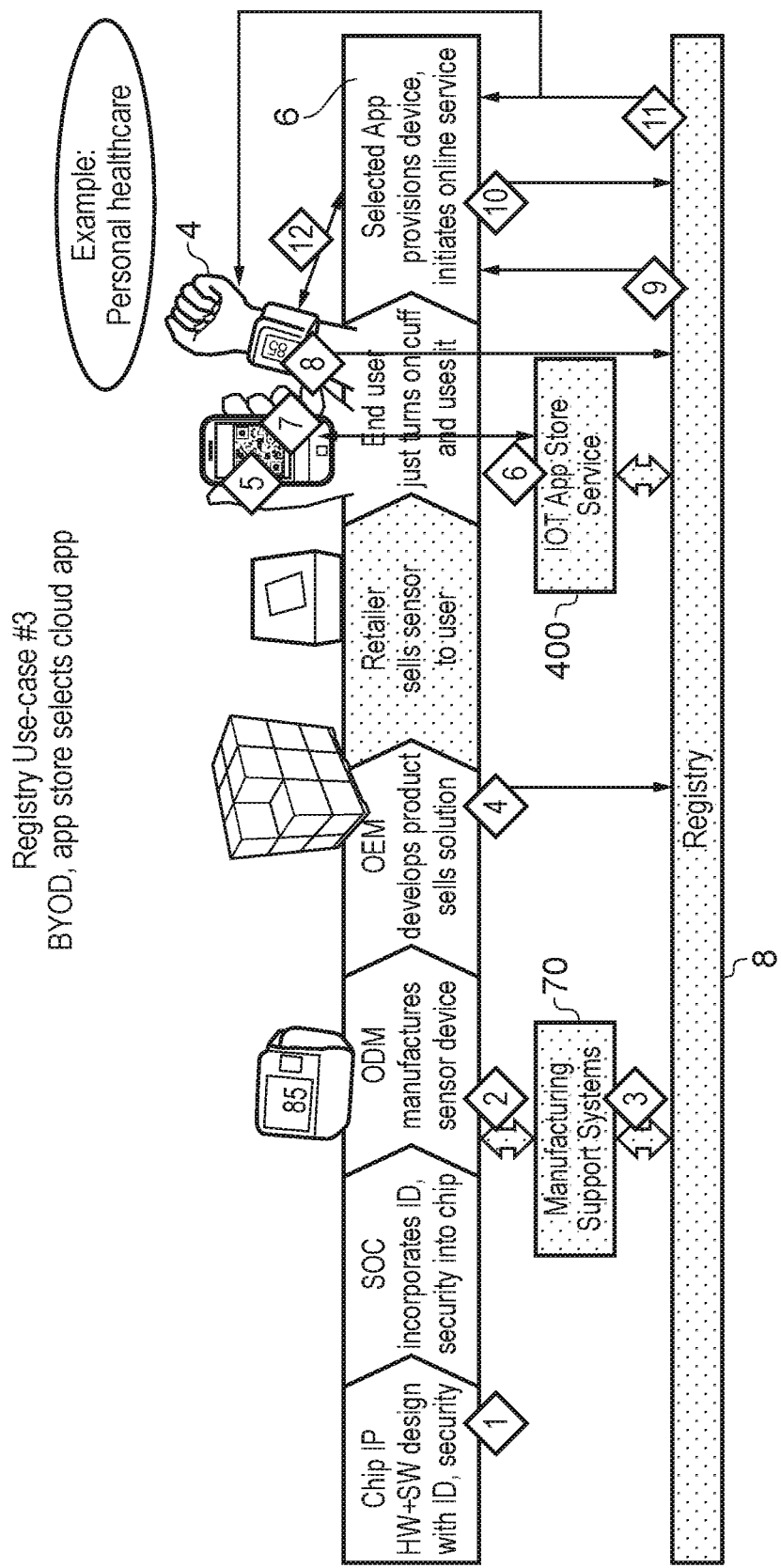

FIG. 22 shows a third use case in which an "buy your own device" (BYOD) sensor 4 is bought by the user and in which the user is free to select one of several different application providers for use with the sensor 4. An Internet of Things (IOT) app store 400 is used to make this selection. Steps 1-4 in FIG. 22 are the same as in FIG. 21. Again the sensor 4 is sold to a retailer who sells it on to an end user. At step 5, the user runs the app store 400 on a smart phone, tablet, or computer, and again a QR code or similar technique is used to gather the device ID of the sensor 4. At step 6, the app store 400 validates the sensor's device ID with a registry 8. For example the app store 400 can query the registry 8 to determine the authentication model used by the agent device or other capability of the agent device and then can prepare a menu of compatible apps that work with the agent device 4. The user is provided with a menu of apps and selects a desired app, runs it and logs in. At step 7 the app store updates the registry with the user's selection so that the registry associates the sensor's device ID with the application identifier of the selected application. The app store also sends the sensor's device ID and the user ID to the selected application provider 6 so that it can link the user ID and sensor ID together. At this point the registry 8 knows which application a specific sensor 4 will communicate with, and the application provider knows which customer is associated with that sensor 4. Steps 8-12 of FIG. 22 are then the same as steps 7-11 of FIG. 21 respectively, in which mutual authentication between the sensor 4 and the registry 22 takes place, and then secure communication is established between the sensor 4 and application provider 6.

Figure 23:
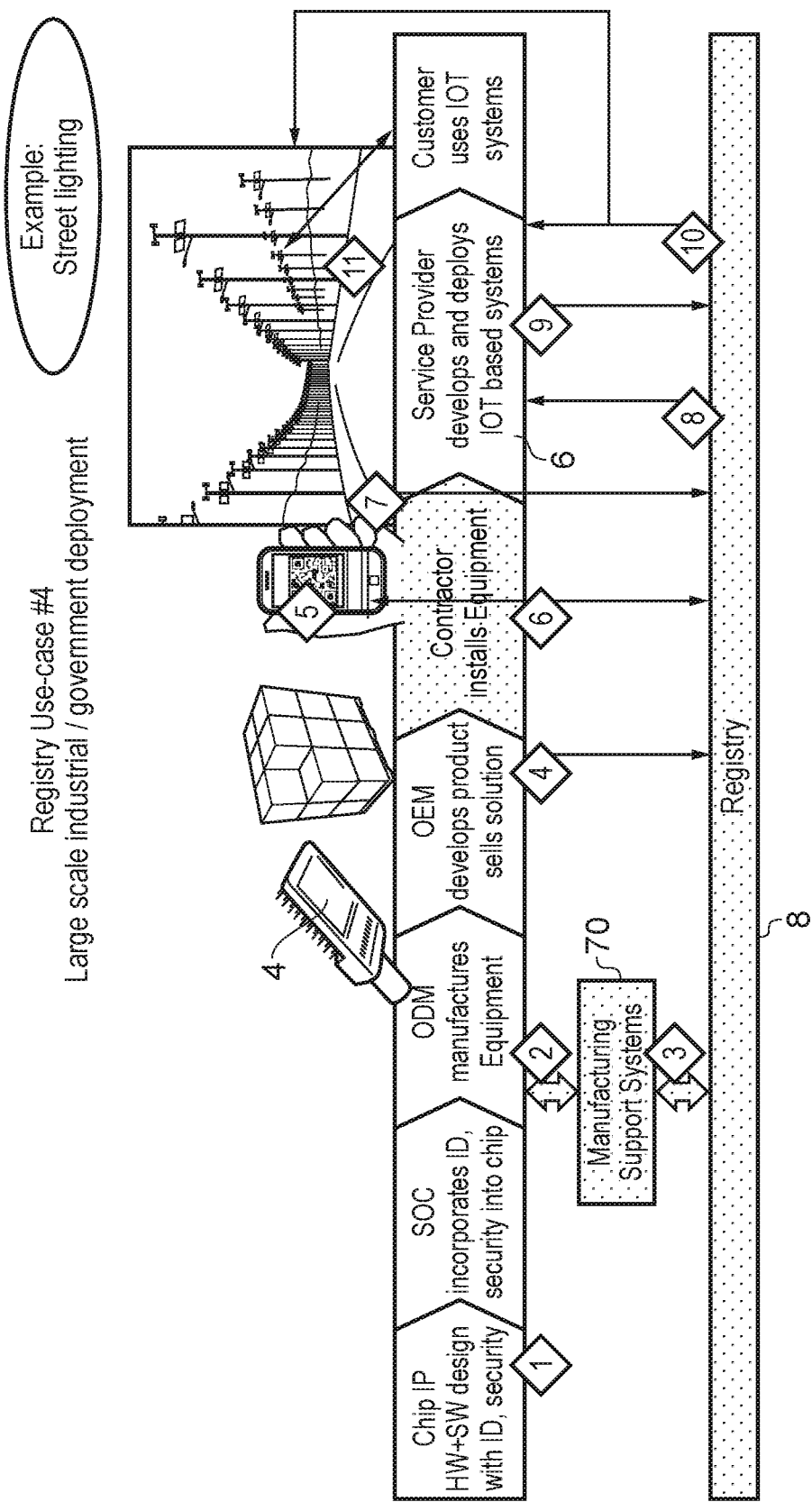

FIG. 23 shows a fourth use case in which the agent device 4 is used in a large scale industrial or government deployment instead of in personal healthcare. In this example, the agent devices are sensors 4 installed on street lights which feed back data on the operation of the street lights to a cloud platform, which a maintenance provider can then use to determine which street lights need repairing, for example. Steps 1-3 are again the same as in FIGS. 20-22. At step 4, the products containing the sensor are manufactured and provided to a contractor. For example, the street lights may be manufactured with integral sensors, or alternatively a product containing a sensor may be manufactured separately from the street lights for installing onto the street lights at a later stage. The registry can be updated at this point to reflect the sale of the sensor 4 to a particular service provider 6, or alternatively this can be done later on installation of the sensor and street lights at step 5, when the contractor may use a smart phone app or similar device to scan a product ID or provide GPS location data for the sensor 4. At step 6, the contractor's device may send the device ID of the sensor 4 to the registry together with the application identifier of the application 6 which will use the sensor data from the sensor 4. The smart phone app may be a simple way of allowing the contractor to make the association request which links the sensor 4 to a particular application 6, without the contractor having to understand what is happening.

At step 7, on activation of the agent devices 4 (for example on power up) the agent devices in the street lights directly contact the registry to establish mutual authentication as discussed above. Once authentication is established, at step 8 the registry notifies the service provider 6 who develops or deploys the Internet of Things (IoT) based systems that the new street lights and agent devices are installed and are online with a valid authenticated case identity. At step 9 the service provider 6 requests an application key for secure communication. At step 10 the registry 8 provides a symmetric application key to the service provider 6 and the agent device itself. Then direct secure communication begins and the IoT platform of the service provider 6 executes applications using the sensor data provided by the sensors 4. A customer (such as a city management office, or a maintenance contractor company) may also access the IoT system using a web platform for example (step 11). Hence, in the example of FIG. 23, the use of the registry 8 simplifies the contractor's job of installing equipment since the contractor can simply fit the agent device, scan a code and/or activate the agent device using a simple means such as plugging in the power or pressing a single button, and then the registry 8 takes care of authenticating the agent device and establishing the connection with the application providing apparatus 6. The contractor does not need to spend time interacting with a user interface for configuring the agent device.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. A method for assigning an agent device, which is registered in a first device registry maintained by a first registry apparatus for authenticating agent devices for communicating with one or more first application providing apparatuses, to a second device registry maintained by a second registry apparatus for authenticating agent devices for communicating with one or more second application providing apparatuses, wherein the first device registry comprises first authentication information for authenticating the identity of the agent device and one or more event entries corresponding to the agent device, the event entries providing information about events that have occurred in relation to the agent device; the method comprising:
   (a) receiving, at the first registry apparatus from a requestor device, a device assignment request requesting that the agent device is assigned to the second device registry;
   (b) in response to the device assignment request from the requestor device, checking whether the agent device is allowed to be assigned to the second device registry;
   (c) if the agent device is allowed to be assigned to the second device registry, triggering the agent device to transmit, to the second registry apparatus for registration in the second device registry, second authentication information for authenticating the identity of the agent device; and
   (d) enabling creation of an event entry for the assignment of the agent device to the second device registry.

2. The method according to claim 1, wherein the event entries comprise one or more of: a device ID of the agent device; date information representing a date on which an event took place; an event record indicating a type of event which took place; a signature/hash.

3. The method according to claim 1, wherein the event entries are created on occurrence of an event associated with the agent device.

4. The method according to claim 1, wherein the events that have occurred in relation to the agent device comprises one or more of: dispatch of the agent device from manufacture; shipping of the agent device; activation of the agent device; deactivation of the agent device; registration of the agent device by a consumer.

5. The method according to claim 1, wherein the event entries allows the registries to track the history of the agent device.

6. The method according to claim 1, wherein the agent device comprises authentication information generating circuitry for generating the second authentication information.

7. The method according to claim 1, wherein the first authentication information for the agent device is deleted from the first device registry after determining that the agent device is allowed to be assigned to the second device registry.

8. The method according to claim 1, wherein the first authentication information comprises a first public key corresponding to a first private key held by the agent device, and the second authentication information comprises a second public key corresponding to a second private key held by the agent device.

9. The method according to claim 8, wherein the agent device deletes the first private key after the second authentication information is transmitted for registration in the second device registry.

10. The method according to claim 1, wherein the requestor device comprises a second registry apparatus.

11. The method according to claim 1, wherein said checking whether the agent device is allowed to be assigned to the second device registry comprises authenticating the requestor device.

12. The method according to claim 1, wherein said checking whether the agent device is allowed to be assigned to the second device registry comprises checking that the requestor device is a trusted device that has already been authenticated.

13. The method according to claim 1, wherein said checking whether the agent device is allowed to be assigned to the second device registry comprises checking that the agent device supports assignment to the second device registry.

14. The method according to claim 1, further comprising steps of:
 (e) receiving a reset request to reassign the agent device to the first device registry;
 (f) checking whether the agent device is allowed to be reassigned to the first device registry in response to the reset request;
 (g) if the agent device is allowed to be reassigned to the first device registry, transmitting, for registration in the first device registry, third authentication information for authenticating the identity of the agent device; and
 (h) enabling creation of an event entry corresponding to the reassignment of the agent device to the first device registry.

15. The method according to claim 1, wherein the agent device is assigned from the first device registry to the second device registry without intervention from a user of the agent device.

16. A registry apparatus for authenticating agent devices for communicating with one or more application providing apparatuses, comprising:
 storage circuitry configured to store a first device registry of agent devices, the first device registry comprising first authentication information for authenticating the identity of the agent devices and one or more event entries corresponding to each agent device, the event entries providing information about events that have occurred in relation to the corresponding agent device;
 communication circuitry configured to receive, from a requestor device, a device assignment request requesting that a specified agent device registered in the first device registry is assigned to a second device registry of agent devices; and
 processing circuitry configured to check whether the specified agent device is allowed to be assigned to the second device registry in response to the device assignment request, and if the specified agent device is allowed to be assigned to the second device registry, configured to control the communication circuitry to trigger the agent device to transmit, to the second device registry for registration in the second device registry, second authentication information for authenticating the identity of the agent device, and configured to create an event entry corresponding to the specified agent devices assignment to the second device registry.

17. The registry apparatus according to claim 16, wherein if the agent device is allowed to be assigned to the second device registry, then the processing circuitry is configured to delete from the first device registry the authentication information for authenticating the identity of the specified agent device.

18. The registry apparatus according to claim 16, wherein in response to a reset request received by the communication circuitry, the reset request requesting that a selected agent device registered with the second device registry is reassigned to the first device registry, the processing circuitry is configured to check whether the selected agent device is allowed to be reassigned to the first device registry, and if the selected agent device is allowed to be reassigned to the first device registry, to register in the first device registry authentication information, and to create an event entry corresponding to the reassignment of the specified agent device to the first device registry.

19. A registry apparatus for authenticating agent devices for communicating with one or more application providing apparatuses, comprising:
 storage means for storing a first device registry of agent devices, the first device registry comprising first authentication information for authenticating the identity of the agent devices and one or more event entries corresponding to each agent device, the event entries providing information about events that have occurred in relation to each agent device;
 communication means for receiving, from a requestor device, a device assignment request requesting that a specified agent device registered in the first device registry is assigned to a second device registry of agent devices; and
 processing means for checking whether the specified agent device is allowed to be assigned to the second device registry in response to the device assignment request, and if the specified agent device is allowed to be assigned to the second device registry, for controlling the communication means to trigger the agent device to transmit, to the second device registry for registration in the second device registry, second authentication information for authenticating the identity of the agent device, and for creating an event entry corresponding to the specified agent devices assignment to the second device registry.

\* \* \* \* \*